(12) United States Patent
Ziarno et al.

(10) Patent No.: US 9,576,404 B2
(45) Date of Patent: Feb. 21, 2017

(54) SYSTEM AND METHOD OF TRANSMITTING DATA FROM AN AIRCRAFT

(71) Applicant: HARRIS CORPORATION, Melbourne, FL (US)

(72) Inventors: James J. Ziarno, Malabar, FL (US); Shawn H. Gallagher, Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 0 days.

(21) Appl. No.: 14/829,685

(22) Filed: Aug. 19, 2015

(65) Prior Publication Data

US 2015/0363981 A1 Dec. 17, 2015

Related U.S. Application Data

(63) Continuation-in-part of application No. 14/248,696, filed on Apr. 9, 2014, now Pat. No. 9,191,053, which
(Continued)

(51) Int. Cl.
*G06F 19/00* (2011.01)
*G06F 7/00* (2006.01)
(Continued)

(52) U.S. Cl.
CPC ............ *G07C 5/008* (2013.01); *G07C 5/0841* (2013.01); *H04B 1/3822* (2013.01); *H04B 1/40* (2013.01);
(Continued)

(58) Field of Classification Search
CPC ............ H04B 7/18506; H04B 1/3822; H04B 7/18508; H04B 7/18504; H04W 84/06; H04W 84/005; H04W 84/02; H04W 84/12; H01Q 1/28; G06F 21/34; G09G 2380/12; G05B 23/0213; G05B 23/0224; B64D 2045/0085; B64D 45/00; G07C 5/0841; G07C 5/008; H04L 67/12; H04L 69/14
(Continued)

(56) References Cited

U.S. PATENT DOCUMENTS 3,906,437 A 9/1975 Brandwein
4,280,185 A 7/1981 Martin
(Continued)

FOREIGN PATENT DOCUMENTS

EP 0407179 7/1990
GB 2276006 9/1994
(Continued)

OTHER PUBLICATIONS

Office Action in Ex Parte Reexamination mailed Dec. 19, 2007; U.S. Appl. No. 90/008,567; filed Mar. 30, 2007; 21 pgs.
(Continued)

*Primary Examiner* — Olumide T Ajibade Akonai
(74) *Attorney, Agent, or Firm* — Allen, Dyer, Doppelt, Milbrath & Gilchrist, P.A.

(57) ABSTRACT

A system for transmitting aircraft data from an aircraft includes a Data Acquisition Unit (DAU) that records aircraft data. A PC card is interfaced to the DAU and stores the aircraft data from the DAU. A processor retrieves aircraft data from the memory. A first wireless transceiver is controlled by the processor and receives and transmits the aircraft data along a wireless communications signal. A wireless local area network (LAN) communications unit is configured as an access point and positioned within the aircraft and transmits and receives wireless communications signals to and from the PC card. A second wireless trans-
(Continued)

ceiver is mounted within the aircraft and receives the wireless communications signal from the wireless LAN communications unit for transmitting the aircraft data from the aircraft.

27 Claims, 18 Drawing Sheets

Related U.S. Application Data is a continuation of application No. 11/899,349, filed on Sep. 5, 2007, now Pat. No. 8,744,372, which is a continuation of application No. 10/942,630, filed on Sep. 16, 2004, now Pat. No. 7,620,374.

(51) Int. Cl.
| | |
|---|---|
| G07C 5/00 | (2006.01) |
| G07C 5/08 | (2006.01) |
| H04B 1/40 | (2015.01) |
| H04B 1/3822 | (2015.01) |
| H04B 7/185 | (2006.01) |
| H04L 29/08 | (2006.01) |
| H04W 84/12 | (2009.01) |
| B64D 45/00 | (2006.01) |
| G05B 23/02 | (2006.01) |

(52) U.S. Cl.
CPC ........... *H04B 7/18506* (2013.01); *H04L 67/12* (2013.01); *B64D 2045/0085* (2013.01); *G05B 23/0213* (2013.01); *H04W 84/12* (2013.01)

(58) Field of Classification Search
USPC ..... 701/3, 14, 33.2, 33.3, 33.4; 455/431, 98, 455/558, 550.1, 66.1, 41.2, 95, 97; 340/945, 340/964, 971, 973
See application file for complete search history.

(56) References Cited

U.S. PATENT DOCUMENTS

| | | |
|---|---|---|
| 4,642,775 A | 2/1987 | Cline et al. |
| 4,675,675 A | 6/1987 | Corwin et al. |
| 4,718,229 A | 1/1988 | Riley |
| 4,729,102 A | 3/1988 | Miller, Jr. et al. |
| 4,872,182 A | 10/1989 | McRae et al. |
| 4,908,618 A | 3/1990 | Baker et al. |
| 4,943,919 A | 7/1990 | Aslin et al. |
| 5,022,024 A | 6/1991 | Paneth et al. |
| 5,031,396 A | 7/1991 | Margnelli |
| 5,142,480 A | 8/1992 | Morrow |
| 5,233,626 A | 8/1993 | Ames |
| 5,249,417 A | 10/1993 | Duesler et al. |
| 5,266,922 A | 11/1993 | Smith et al. |
| 5,280,702 A | 1/1994 | Jaw |
| 5,339,330 A | 8/1994 | Mallinckrodt |
| 5,351,194 A | 9/1994 | Ross et al. |
| 5,359,446 A | 10/1994 | Johnson et al. |
| 5,445,347 A | 8/1995 | Ng |
| 5,459,469 A | 10/1995 | Schuchman et al. |
| 5,463,656 A | 10/1995 | Polivka et al. |
| 5,485,868 A | 1/1996 | Jaw et al. |
| 5,521,958 A | 5/1996 | Selig et al. |
| 5,557,917 A | 9/1996 | Jaw |
| 5,652,717 A | 7/1997 | Miller et al. |
| 5,757,772 A | 5/1998 | Thornberg et al. |
| 5,761,625 A | 6/1998 | Honcik et al. |
| 5,905,466 A | 5/1999 | Jha |
| 5,943,399 A | 8/1999 | Bannister et al. |
| 5,978,862 A | 11/1999 | Kou et al. |
| 6,009,356 A | 12/1999 | Monroe |
| 6,047,165 A | 4/2000 | Wright et al. |
| 6,088,632 A | 7/2000 | Zaccaria et al. |
| 6,097,343 A | 8/2000 | Goetz et al. |
| 6,098,133 A | 8/2000 | Summers et al. |
| 6,104,914 A | 8/2000 | Wright et al. |
| 6,108,523 A | 8/2000 | Wright et al. |
| 6,148,179 A | 11/2000 | Wright et al. |
| 6,154,636 A | 11/2000 | Wright et al. |
| 6,154,637 A | 11/2000 | Wright et al. |
| 6,160,998 A | 12/2000 | Wright et al. |
| 6,163,681 A | 12/2000 | Wright et al. |
| 6,167,238 A | 12/2000 | Wright et al. |
| 6,167,239 A | 12/2000 | Wright et al. |
| 6,173,159 B1 | 1/2001 | Wright et al. |
| 6,181,990 B1 | 1/2001 | Grabowsky et al. |
| 6,195,247 B1 | 2/2001 | Cote et al. |
| 6,198,445 B1 | 3/2001 | Alt et al. |
| 6,278,913 B1 | 8/2001 | Jiang |
| 6,304,784 B1 | 10/2001 | Allee et al. |
| 6,308,044 B1 | 10/2001 | Wright et al. |
| 6,308,045 B1 | 10/2001 | Wright et al. |
| 6,353,734 B1 | 3/2002 | Wright et al. |
| 6,385,513 B1 | 5/2002 | Murray et al. |
| 6,393,281 B1 | 5/2002 | Capone et al. |
| 6,438,960 B1 | 8/2002 | Jaw |
| 6,490,543 B1 | 12/2002 | Jaw |
| 6,498,978 B2 | 12/2002 | Leamy et al. |
| 6,519,943 B2 | 2/2003 | Jaw |
| 6,522,867 B1 | 2/2003 | Wright et al. |
| 6,577,500 B2 | 6/2003 | Paredes et al. |
| 6,745,010 B2 | 6/2004 | Wright et al. |
| 6,747,577 B2 | 6/2004 | Chakravarty et al. |
| 6,781,513 B1 | 8/2004 | Korkosz et al. |
| 6,816,728 B2 | 11/2004 | Iglio et al. |
| 6,871,160 B2 | 3/2005 | Jaw |
| 6,894,611 B2 | 5/2005 | Butz et al. |
| 6,898,554 B2 | 5/2005 | Jaw et al. |
| 6,915,189 B2 | 7/2005 | Iglio et al. |
| 6,943,699 B2 | 9/2005 | Ziarno |
| 7,103,456 B2 | 9/2006 | Bloch et al. |
| 7,176,808 B1 | 2/2007 | Broad et al. |
| 7,231,180 B2 | 6/2007 | Benson et al. |
| 7,328,012 B2 | 2/2008 | Ziarno et al. |
| RE40,479 E | 9/2008 | Wright et al. |
| 7,456,756 B2 | 11/2008 | Ziarno |
| 7,489,992 B2 | 2/2009 | Valette et al. |
| 7,496,798 B2 | 2/2009 | Link et al. |
| 7,595,739 B2 | 9/2009 | Zianrno |
| 7,620,374 B2 | 11/2009 | Ziarno et al. |
| 7,755,512 B2 | 7/2010 | Zianrno |
| 7,844,385 B2 | 11/2010 | Loda et al. |
| 7,974,637 B1 | 7/2011 | Taveniku |
| 8,220,038 B1 | 7/2012 | Lucchesi et al. |
| 8,589,994 B2 | 11/2013 | Monroe |
| 8,744,372 B2 | 6/2014 | Ziarno et al. |
| 9,026,273 B2 | 5/2015 | Ziarno et al. |
| 9,026,279 B2 | 5/2015 | Ziarno et al. |
| 9,026,336 B2 | 5/2015 | Ziarno et al. |
| 2002/0004695 A1 | 1/2002 | Glenn et al. |
| 2002/0018008 A1 | 2/2002 | Wright et al. |
| 2002/0123915 A1 | 9/2002 | Denning et al. |
| 2003/0003872 A1 | 1/2003 | Brinkley et al. |
| 2003/0105565 A1 | 6/2003 | Loda et al. |
| 2003/0148735 A1 | 8/2003 | Wright et al. |
| 2003/0176954 A1 | 9/2003 | Jaw |
| 2004/0049715 A1 | 3/2004 | Jaw |
| 2004/0206818 A1 | 10/2004 | Loda et al. |
| 2005/0200526 A1 | 9/2005 | Crain et al. |
| 2005/0228558 A1 | 10/2005 | Valette et al. |
| 2005/0228559 A1 | 10/2005 | Bloch et al. |
| 2005/0275563 A1 | 12/2005 | Ziarno |
| 2006/0007914 A1 | 1/2006 | Chandra et al. |
| 2006/0183474 A1 | 8/2006 | Ziarno et al. |
| 2007/0100529 A1 | 5/2007 | Blythe et al. |
| 2008/0039076 A1 | 2/2008 | Ziarno et al. |
| 2008/0054645 A1 | 3/2008 | Kulkarni et al. |
| 2008/0092520 A1 | 4/2008 | Brown |
| 2008/0119968 A1 | 5/2008 | Loda |
| 2009/0231162 A1 | 9/2009 | Ziarno |
| 2009/0243895 A1 | 10/2009 | Mitchell et al. |
| 2009/0248366 A1 | 10/2009 | Scheid et al. |

(56) References Cited

U.S. PATENT DOCUMENTS

| | | | |
|---|---|---|---|
| 2010/0049377 | A1 | 2/2010 | Scheid et al. |
| 2010/0073197 | A1 | 3/2010 | Eagleton et al. |
| 2010/0211236 | A1 | 8/2010 | Ziarno |
| 2010/0232295 | A1 | 9/2010 | True et al. |
| 2011/0056214 | A1 | 3/2011 | Brown |
| 2011/0173988 | A1 | 7/2011 | Sweet et al. |
| 2012/0065901 | A1 | 3/2012 | Bechhoefer et al. |
| 2012/0095622 | A1* | 4/2012 | Lynch .................. B64C 25/00 701/3 |
| 2013/0332010 | A1 | 12/2013 | Ziarno |
| 2013/0332011 | A1 | 12/2013 | Ziarno |
| 2014/0206303 | A1 | 7/2014 | Ziarno et al. |

FOREIGN PATENT DOCUMENTS

| | | |
|---|---|---|
| JP | 8304497 | 11/1996 |
| JP | S63-42832 | 3/1998 |
| JP | H10508354 | 8/1998 |
| JP | 2002028575 | 1/2002 |
| JP | 2002225823 | 8/2002 |
| JP | 2002312518 | 10/2002 |
| JP | 2003-027691 | 1/2003 |
| JP | 2003044546 | 2/2003 |
| JP | 2003-138948 | 5/2003 |
| JP | 2005219651 | 8/2005 |
| WO | 03/056284 | 7/2003 |
| WO | 2010/028729 | 3/2010 |

OTHER PUBLICATIONS

Spellman, "The Application of Spread Spectrum Datalinks to GPS-Based Air Traffic Navigation, Surveillance, and Control," IEEE, 1994, pp. 194-198.
Tu, "Wireless Ground Communication in Support of Aircraft Maintenance and Flight Operations," SAE Technical Paper Series, 951387, May 1995, 7 pages.
Gate-Aircraft Terminal Environment Link (Gatelink)—Ground Side, ARINC Specification 632, Dec. 30, 1994, 30 pages.
Airlines Electronic Engineering Committee Letter 91-079/DLK-391, Apr. 5, 1991, 40 pages.
Gate-Aircraft Terminal Environment Link (Gatelink)—Aircraft Side, Arinc Characteristic 751, Jan. 1, 1994, 31 pages.
Aviation Week & Space Technology, "Safety Board Urges Mandatory Use of FDR/CVRs in Commuter Transports," Avionics, McGraw-Hill, Inc., Aug. 31, 1987, 5 pages.
Aviation Week & Space Technology, "Conversion Approach Appears Flawed," Aerospace Business, vol. 139, No. 4, McGraw-Hili, Inc., Jul. 31, 1993, 3 pages.
Electronic Engineering Times, "Module is Result of Work With Apple—Plessey Makes Leap With Wireless LAN," Nov. 7, 1994, 3 pages.
W.R. Beckman, "L-1011 Flight Data Recording Systems—Background, Features, Implications and Benefits," AIAA Aircraft Systems and Technology Conference, Los Angeles, California, Aug. 21-23, 1978, 9 pages. (Exhibit 8).
ARINC Characteristic 591, "Quick Access Recorder for AIDS System (QAR)," Airlines Electronic Engineering Committee, Aeronautical Radio, Inc., May 18, 1972, 21 pages. (Exhibit 9).
"Wired Datalink for the Parked Airplane," Paper Presented at AEEC Data Link Subcommittee Meeting, May 16, 1989, 10 pages.
Mini QAR (Quick-Access Recorder), Avionics Test Solutions brochure, published by Avionica, 1996, 3 pages.
Future Concepts for Maintenance, Report of the Portable Maintenance Access Terminal (PMAT) Working Group Meeting, ARINC, 94-205/FCM-69, Sep. 1, 1994, 38 pages.
"McGraw-Hill Illustrated Telecom Dictionary," Jade Clayton, 1998, pp. 390, 391.
Bei et al., "Wireless Sensor Network for Aircraft Health Monitoring," China Communications, Technology Forum, Feb. 2005, pp. 70-77.
Bai et al., "Wireless Sensor Network for Aircraft Health Monitoring," Proceedings of the First International Conference on Broadband Networks, Aug. 12, 2004, pp. 1-3.
Ashby et al., "Intelligent Maintenance Advisor for Turbine Engines," IEEE, 2000, pp. 211 219.
"Systems for Engine Health Monitoring," Maintenance & Engineering, Aircraft Commerce, Feb./Mar. 2006, Issue No. 44, pp. 53-57.
"Health Monitoring, Finding Out What's Wrong in Advance," Meggitt, Aerospace/Health Monitoring, Jun. 25, 2009, pp. 1-5.
"Intelligent Fault Tolerant Engine Control," Reports on a Project Between The Ohio State University and NASA Glenn Research Center, Controls and Dynamics Technology Branch, Oct. 27, 2010, http://www2.ece.ohio-state.edu/~passino/NASA.html, 4 pages.
Volponi et al., "Development of an Information Fusion System for Engine Diagnostics and Health Management," Prepared for the 39th Combustion/27th Airbreathing Propulsion/21st Propulsion Systems Hazards/3rd Modeling and Simulation Joint Subcommittee Meeting, Dec. 1-5, 2003, NASA/TM-2004-212924, Feb. 2004, 13 pages.
McConnell, "Commercial: Engine Prognostics, Aircraft Operators and OEMs are Demanding Smarter Sensors to.Monitor Turbine Engine Performance," Internet Article, Aug. 1, 2007, http://aviationtoday.com/print/av/issue/feature/Commercial-Engine-Prognostics_14 . . . 3 pages.
Wood, "Perspective on Controls & Diagnostics," NASA Glenn Research Center, 2009 Propulsion Control and Diagnostics Workshop, Dec. 2009, 10 pages.
Simon, Integrated Vehicle Health Management, "Propulsion Gas Path Health Management Task Overview," Propulsion Control and Diagnostics Workshop, Dec. 2009, 29 pages.
Seemann, "Modeling the Life Cycle Cost of Jet Engine Maintenance," Technische Universitat Hamburg-Harburg, Institut fur Lufttransportsysteme, Oct. 2010, 107 pages.
Donaldson et al., "Economic Impact of Derated Climb on Large Commercial Engines," 2007 Boeing Performance and Flight Operations Engineering Conference, 14 pages.
Advert, "Engine Maintenance Concepts for Financiers," Version 1, Mar. 15, 2010, 30 pages.
Flight Operations Briefing Notes, Supplementary Techniques, Handling Engine Malfunctions, Airbus Customer Services, Cedex, France, Dec. 2006, 17 pages.

\* cited by examiner

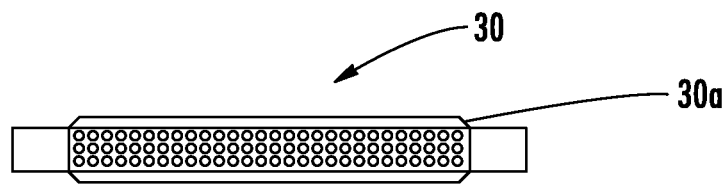
FIG. 3A
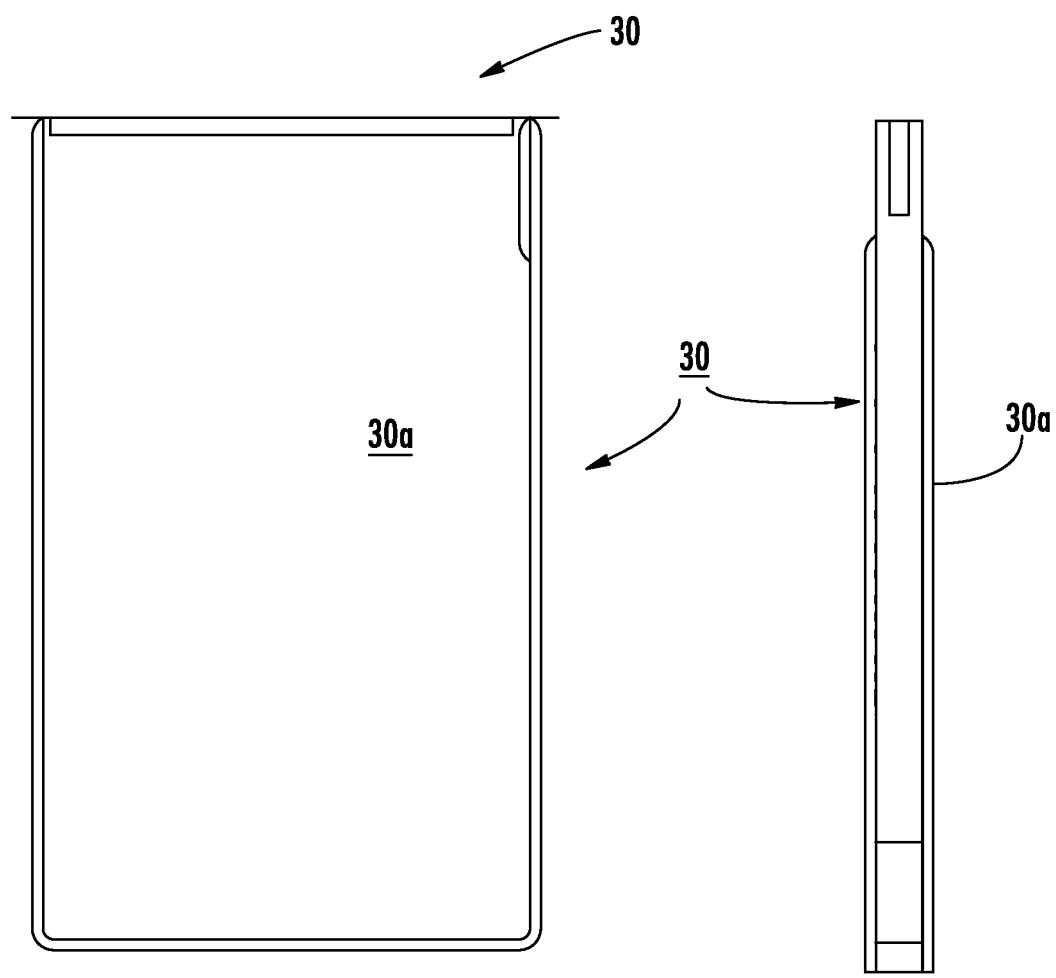
FIG. 3B
FIG. 3C

SYSTEM AND METHOD OF TRANSMITTING DATA FROM AN AIRCRAFT

PRIORITY APPLICATION(S)

This is a continuation-in-part application of Ser. No. 14/248,696 filed Apr. 9, 2014, which is a continuation application of Ser. No. 11/899,349 filed Sep. 5, 2007 (now U.S. Pat. No. 8,744,372), which is a continuation application of Ser. No. 10/942,630 filed Sep. 16, 2004 (now U.S. Pat. No. 7,620,374), the disclosures which are hereby incorporated by reference in their entirety.

FIELD OF THE INVENTION

The present invention relates to communication systems, and more particularly, the present invention relates to a system and method of transmitting data from an aircraft.

BACKGROUND OF THE INVENTION

A Digital Acquisition Unit (DAU), also known by some skilled in the art as a DFDAU, receives signals from many on-board aircraft systems. The DAU processes the data as Flight Operations Quality Assurance (FOQA) data, which is recovered from the aircraft by different prior art techniques. For example, a PCMCIA card may connect into an auxiliary PCMCIA slot of the Data Acquisition Unit and record data into a flash memory of the card. Once the data is collected into flash memory, airline operators manually replace the PCMCIA cards with a new card and retrieve the aircraft data from the flash memory of the old card.

Other prior art techniques for collecting this aircraft data include wireless systems, which often require costly aircraft modifications. For example, a separate unit to record data, such as a ground data link unit, is required, and an additional aircraft antenna must be mounted on the fuselage. Often aircraft wiring changes are made. These ground data link units require a data processor, a data collection circuit, a wireless LAN radio, a power amplifier, and external fuselage antenna. Multiple line receiver units are also often required adding to the significant investment made by an aircraft operator.

Examples of a ground data link systems that have been used in an aircraft are disclosed in commonly assigned U.S. Pat. Nos. 6,047,165; 6,104,914; 6,108,523; 6,148,179; 6,154,636; 6,154,637; 6,160,998; 6,163,681; 6,167,238; 6,167,239; 6,173,159; 6,308,044; 6,308,045; 6,353,734; 6,522,867; and 6,745,010, the disclosures which are hereby incorporated by reference in their entirety.

It would be desirable, however, to extract Flight Operations Quality Assurance data or other aircraft data from an aircraft component, such as a DAU, in a less complicated and costly system, rather than using a ground data link unit or manually replacing flash memory PCMCIA cards.

SUMMARY OF THE INVENTION

A system for transmitting aircraft data from an aircraft comprises a Data Acquisition Unit (DAU) that records aircraft data. A PC card is interfaced to the DAU and comprises a memory that stores the aircraft data from the DAU. A processor is coupled to the memory and configured to retrieve aircraft data from the memory. A first wireless transceiver is controlled by the processor and receives and transmits the aircraft data along a wireless communications signal. A wireless local area network (LAN) communications unit is configured as an access point and positioned within the aircraft that transmits and receives wireless communications signals to and from the PC card. A second wireless transceiver is mounted within the aircraft and receives the wireless communications signal containing aircraft data from the wireless LAN communications unit and transmits the aircraft data from the aircraft.

The second wireless transceiver may comprise a UHF transceiver configured to transmit and receive aircraft data over an air-to-ground communications signal. In another example, the second wireless transceiver may comprise a satellite communications transceiver configured to transmit and receive aircraft data over a satellite communications link. The aircraft data may comprise data related to at least one of aircraft contents, passenger data, aircraft departure and arrival, passenger transactions or data from a sky marshall. The aircraft data may comprise flight performance data. In another example, the aircraft may comprise one of at least full flight aircraft engine data and parsed aircraft engine data.

A logic circuit may be connected to the processor and DAU and configured to allow the DAU to extract aircraft data from the DAU into the memory of the PC card. The wireless communications signal may comprise a spread spectrum communications signal.

An aircraft data communications system for an aircraft comprises an engine monitoring module configured to be mounted at an aircraft engine of the aircraft and comprising a wireless engine monitoring transceiver, a first memory, and a first processor coupled to the first memory and wireless engine monitoring transceiver. The processor is configured to collect and store in the first memory engine data relating to at least one engine parameter sensed during operation of the aircraft engine and transmit the engine data over a wireless communications signal. A Data Acquisition Unit (DAU) records aircraft data and a PC card is interfaced to the DAU and comprises a second memory that stores aircraft data from the DAU and engine data received from the engine monitoring module. A second processor is coupled to the second memory and configured to retrieve aircraft data and engine data. A first wireless transceiver is controlled by the second processor and receives engine data transmitted from the engine monitoring module for storage within the second memory and wirelessly transmit the aircraft data and engine data along a wireless communications signal. A wireless local area network (LAN) communications unit is configured as an access point and positioned within the aircraft and transmits and receives wireless communications signals to and from the PC card. A second wireless transceiver is mounted within the aircraft and receives the wireless communications signal containing aircraft data from the wireless LAN communications unit for transmitting the aircraft data from the aircraft.

The first processor at the engine monitoring module is configured to retrieve engine data and parse the engine data into selected segments of engine data. A plurality of wireless engine sensors may be associated with the aircraft engine, each configured to sense an engine parameter as engine data and transmit the engine data to the wireless engine monitoring transceiver for transmission to the PC card. Each wireless engine sensor may be configured to receive from the wireless engine monitoring module an engine sensing algorithm having data for changing a sampling rate of selected wireless engine sensors.

A method for transmitting aircraft data from an aircraft comprises acquiring aircraft data within a memory of a PC card that is interfaced to a Data Acquisition Unit (DAU) of the aircraft and retrieving aircraft data from the memory. The method includes wirelessly transmitting from a first wireless transceiver the retrieved aircraft data along a wireless communications signal and receiving the wireless communications signal within a wireless local area network (LAN) communications unit mounted within the aircraft and configured as a wireless access point. The method further includes transmitting the aircraft data from the wireless LAN communications unit to a second wireless transceiver mounted within the aircraft and transmitting the aircraft data from the second wireless transceiver out of the aircraft.

BRIEF DESCRIPTION OF THE DRAWINGS

Other objects, features and advantages of the present invention will become apparent from the detailed description of the invention which follows, when considered in light of the accompanying drawings in which:

FIGS. 3A, 3B and 3C are respective front elevation, top plan and side elevation views of the PC card of the present invention in a desired Type III PCMCIA form factor.

DETAILED DESCRIPTION

Figure 1:
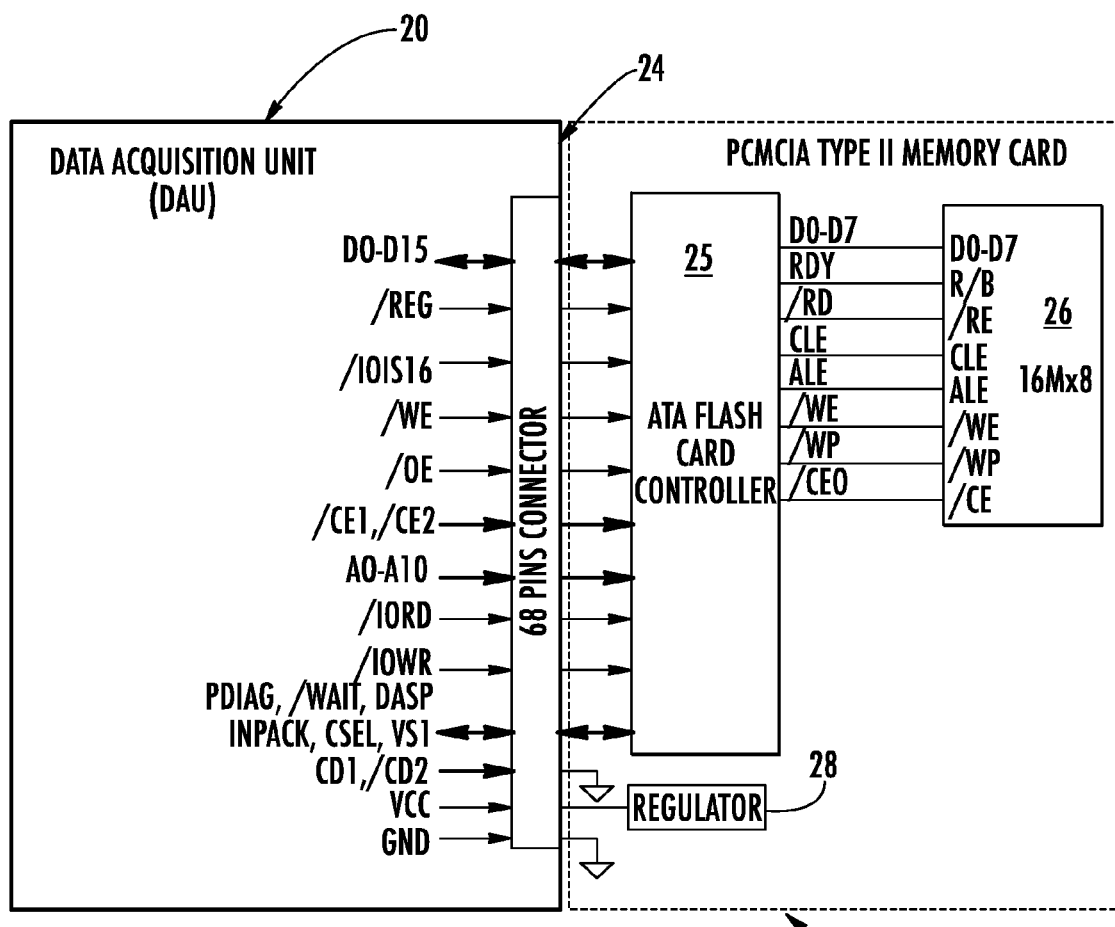
FIG. 1 is a block diagram showing an aircraft Data Acquisition Unit and a prior art PCMCIA Type II memory card interfaced with the Data Acquisition Unit, and showing the different inputs from the Data Acquisition Unit into the PCMCIA memory card.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention automatically and without manual intervention allows Flight Operations Quality Assurance (FOQA) or other aircraft data to be extracted from an aircraft component, such as the Digital Acquisition Unit (DAU), into a PC card, without requiring airline operators to manually replace the PC cards to obtain the FOQA data, as in many prior art systems. The present invention is also advantageous over prior art wireless systems, which normally require costly aircraft modification, including the use of a separate unit to record aircraft data, an external aircraft antenna mounted on the fuselage, and aircraft wiring changes.

The present invention uses a single PC card, for example, a PC card operable in accordance with the Personal Computer Memory Card International Association (PCMCIA). The present invention uses the passive radiation coupling of a radio frequency communications signal into the skin of the fuselage, which radiates, i.e., re-radiates the radio frequency communications signal received from the PC card, which had radiated the signal from its antenna, and eliminates the necessity for adding an additional, external aircraft antenna mounted on the fuselage.

Prior art systems include the use of a flash memory PCMCIA card, or an integrated system such as the ground data link systems disclosed in the above-identified, commonly assigned, and incorporated by reference patents. The ground data link system disclosed in those patents sometimes require multiple Local Receiver Units (LRU's) and a data collection unit having a central processing unit, a wireless local area network (LAN) radio, a power amplifier, and an external fuselage antenna.

The ground data link unit as disclosed in the above-identified and incorporated by reference patents operates with the ARINC 763 system, and is connected into the Data Acquisition Unit (DAU) (also known as the DFDAU), typically through the optional auxiliary output using an ARINC 429 link.

The Digital Access Unit system typically includes a separate central processing unit (CPU) for a mandatory portion or segment that connects by a ARINC 717 link to the Digital Flight Data Recorder (DFDR). The DAU receives sensor information from the aircraft engines, flaps, electronics and numerous other aircraft systems, sometimes as many as 2,000 different systems in large commercial aircraft. An optional portion of the DAU typically includes a separate CPU and an optional/auxiliary output, for example, formed as a PCMCIA slot. The prior art multiple-LARU approach using an external fuselage antenna and a ground data link unit, or similar devices, typically required expensive equipment acquisition and aircraft modifications. This often required that the aircraft be out-of-service to place the system in operation. Also, sometimes FAA certification was required, which took time after or before installation.

Although some prior art systems include a standard PCMCIA Type II memory card interfaced to the DAU, the card still had to be manually removed for data retrieval. Other prior art systems used quick access recorders having optical/magnetic media, which had to be removed for data retrieval.

The present invention allows aircraft operators to extract aircraft data, such as Flight Operations Quality Assurance (FOQA) data, from the aircraft while minimizing their costs of such retrieval.

The present invention uses a removable PC card, such as a PCMCIA card, with a flash storage memory circuit, control logic circuitry, a processor, wide local area network (WLAN) radio drivers, and a complete 802.11 WLAN transceiver that transmits the aircraft data and receives data for on-board processing. The use of a PC card reduces cost to the aircraft operator without requiring the aircraft to be out-of-service while a system is installed. No external antenna is required because the aircraft skin and fuselage acts as a passive radiator, in accordance with the present invention, to transmit or receive data from the aircraft. This can optimize transmission from the aircraft and reduce internal aircraft multipath attenuation.

FIG. 1 illustrates a conventional Digital Acquisition Unit (DAU) 20 and a PC card designed as a PCMCIA flash memory card 22 connected into the optional PCMCIA connector 24 of the DAU, which interfaces an auxiliary ARINC 429 link. This prior art PCMCIA memory card 22 was typically a Type II memory card, and included an ATA flash card controller 25 that connected into a flash memory 26, and a regulator circuit 28. The ATA standard is an AT attachment for a preferred IDE drive interface on a PC card. The PCMCIA connector 24 on the DAU 20 is formed as a 68-pin connector that connects to the PCMCIA Type II memory card 22 as shown in FIG. 1. The memory card typically has about 256 megabytes of storage and a thickness of about 5 mm. FIG. 1 also shows the various functions and data that can be extracted from the DAU and input into the ATA flashcard controller 25. FIG. 1 also shows the different connections to the flash memory 26 from the ATA flashcard controller 25. The chart below shows the pinouts and pin identification.

Pinouts

| Pin No. | Pin Name |
|---|---|
| 01 | GND |
| 02 | D3 |
| 03 | D4 |
| 04 | D5 |
| 05 | D6 |
| 06 | D7 |
| 07 | /CE1 |
| 08 | A10 |
| 09 | /OE |
| 10 | RFU |
| 11 | A9 |
| 12 | A8 |
| 13 | RFU |
| 14 | RFU |
| 15 | /WE |
| 16 | /IRQ |
| 17 | VCC |
| 18 | RFU |
| 19 | RFU |
| 20 | RFU |
| 21 | RFU |
| 22 | A7 |
| 23 | A6 |
| 24 | A5 |
| 25 | A4 |
| 26 | A3 |
| 27 | A2 |
| 28 | A1 |
| 29 | A0 |
| 30 | D0 |
| 31 | D1 |
| 32 | D2 |
| 33 | /IO16 |
| 34 | GND |
| 35 | GND |
| 36 | /CD1 |
| 37 | D11 |
| 38 | D12 |
| 39 | D13 |
| 40 | D14 |
| 41 | D15 |
| 42 | /CE2 |
| 43 | VS1 |
| 44 | /IORD |
| 45 | /IOWR |
| 46 | RFU |
| 47 | RFU |
| 48 | RFU |
| 49 | RFU |
| 50 | RFU |
| 51 | VCC |
| 52 | RFU |
| 53 | RFU |
| 54 | RFU |
| 55 | RFU |
| 56 | CSEL |
| 57 | RFU |
| 58 | RST |
| 59 | /WAIT |
| 60 | INPACK |
| 61 | /REG |
| 62 | DASP |
| 63 | PDIAG |
| 64 | D8 |
| 65 | D9 |
| 66 | D10 |
| 67 | /CD2 |
| 68 | GND |

Pin Identification

| Symbol | Function |
| --- | --- |
| D0-D15 | Data Bus (bidirectional) |
| A0-A10 | Address Bus (input) |
| /CE1, /CE2 | Card Enable (input) |
| /OE, /WE | Output/Write Enable (input) |
| /REG | Register Select (input) |
| /IORD, /IOWR | I/O Access (input) |
| /CD1, /CD2 | Card Detect (output) |
| /IRQ, /IO16, RST, /WAIT, DASP, CSEL, PDIAG, INPACK | I/O Handshaking (input/output) |
| RFU | Reserved for Future Use |
| VCC | +5 V or +3.3 V power input |

Figure 2:
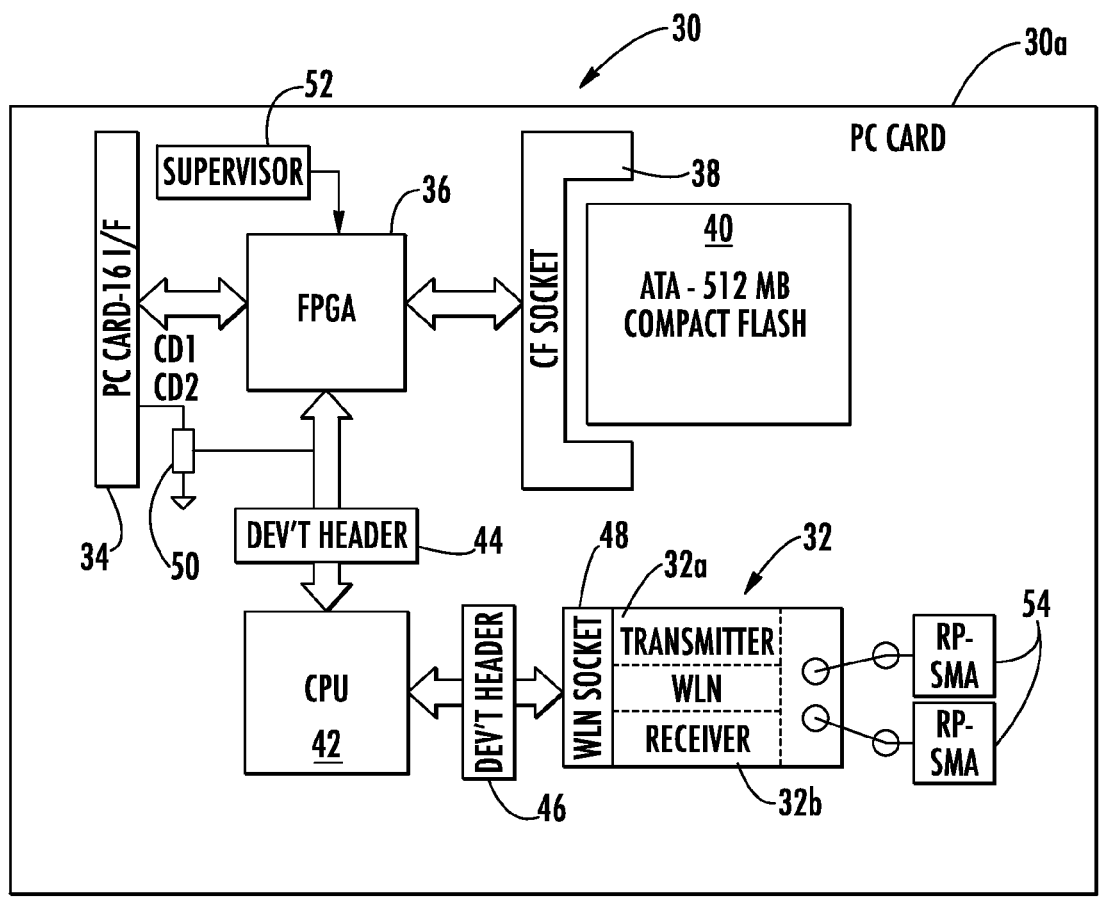
FIG. 2 is a block diagram of the PC card of the present invention, which interfaces with an aircraft component, such as a Digital Acquisition Unit, and showing a processor, logic circuit, memory and transceiver.

FIG. 2 is a block diagram of the PC card 30 of the present invention, which includes a wireless transceiver 32 for transmitting aircraft data, including Flight Operations Quality Assurance (FOQA) data, and receiving data for on-board processing. The transceiver 32 includes respective transmitter and receiver sections 32a, 32b. FIGS. 3A, 3B and 3C show one form factor for the PC card 30 of the present invention. The PC card includes a body 30a formed as a PCMCIA Type III memory card, which is about 10.5 mm thick and sufficiently large enough to hold the additional circuitry, logic circuits, controller (or processor), and transceiver used in the PC card of the present invention.

As illustrated in FIG. 2, the PC card 30 of the present invention includes a PC card-16 I/F interface circuit 34. A Field Programmable Gate Array (FPGA) 36 circuit acts as logic circuitry to interface a CF socket 38, the ATA 512 megabyte compact flash memory 40, and the interface circuit 34. The PC card 30 of the present invention includes a central processing unit or processor 42, which interfaces through a development header circuit 44 with the field programmable gate array 36 and through another development header circuit 46 to the wireless local area network radio transceiver 32 via a radio socket circuit 48.

A communication circuit 50 C01/C02 interfaces between the PC card interface 34 and the data/communications bus on the development header interface 44 between the central processing unit 42 and the field programmable gate array 36. A supervisor circuit 52 is operable with the field programmable gate array 36 as a logic circuit and monitors the PC card operation and its interface with the DAU 20 for controlling the downloading of data from an aircraft component to the memory, and the reading and forwarding of the aircraft data from the memory to the radio transmitter section 32a of the radio transceiver 32 without conflict between the processor and the aircraft component. The supervisor circuit 52 and FPGA 36 permit the disconnection of the CPU 42 in the PC card, and allows the CPU in the DAU 20 to control data extraction from the DAU into the ATA-512 megabyte compact flash memory 40 of the PC card 30. The supervisor 52 and FPGA 36 allows the CPU 42 to read aircraft data from the compact flash memory 26 and forward the aircraft data to the transceiver 32, where the transmitter section 32a of the transceiver wirelessly transmits the aircraft data as a radio frequency communications signal into the skin of the aircraft, which reradiates the radio frequency communications signal to a location remote from the aircraft.

The PC card 30 can include two antenna connections, RP-SMA 54, allowing connection of the transceiver to small linear or other antennas about one or two inches long. Preferably, a conformal antenna would be used, conforming in design to the illustrated Type III PCMCIA card, as one non-limiting example. It should be understood that other form factors can be used in the present invention besides the PCMCIA Type III form factor. The transceiver 32 also includes a receiver circuit 32b, which is operative to receive data for specifying one of the power limits, frequency or type of aircraft data.

In a preferred aspect of the present invention, the WLAN wireless transceiver 32 is operable to transmit aircraft data over a spread spectrum communications signal, such as a frequency hopping or direct sequence spread spectrum communications signal. Preferably the transceiver 32 transfers the aircraft data over a radio frequency signal that is in accordance with 802.11 family of specifications for wireless LAN technology and, in one aspect of the present invention, in accordance with 802.11(b), high rate or the Wi-Fi standard, which applies to wireless LAN's and provides 11 Mbps transmission with a fallback to 5.5, 2 and 1 Mbps in the 2.4 GHz band.

Preferably only a direct sequence spread spectrum communications signal is used, but frequency hopping spread spectrum communications systems can be used in other embodiments, as well as other spread spectrum systems, including modified chirp and similar systems. The present invention also allows wireless functionality, comparable to Ethernet. It should be understood, however, that besides 802.11(b) protocol, other 802.11 or other communication protocols, including different types of complementary code keying (CCK) used with direct sequence spread spectrum technology can be used. The system could include Wired Equivalent Privacy (WEP) by encrypting data and Wi-Fi Protected Access (WPA), which improves security features of the Wired Equivalent Privacy. The system can include improved data encryption through a Temporal Key Integrity Protocol (TKIP), which scrambles the keys using a hashing algorithm and uses an integrity-checking feature. The system can have user authentication through an Extensible Authentication Protocol (EAP), which together with WEP, regulates access to a wireless network based on a computer-hardware specific Media Access Controller (MAC) address. EAP can be built on a secure public key encryption system to ensure only authorized network users access any local area or other network that receives the aircraft data. Other types of frequency-shift keying or phase-shift keying methods can be used for the present invention.

Figure 4:
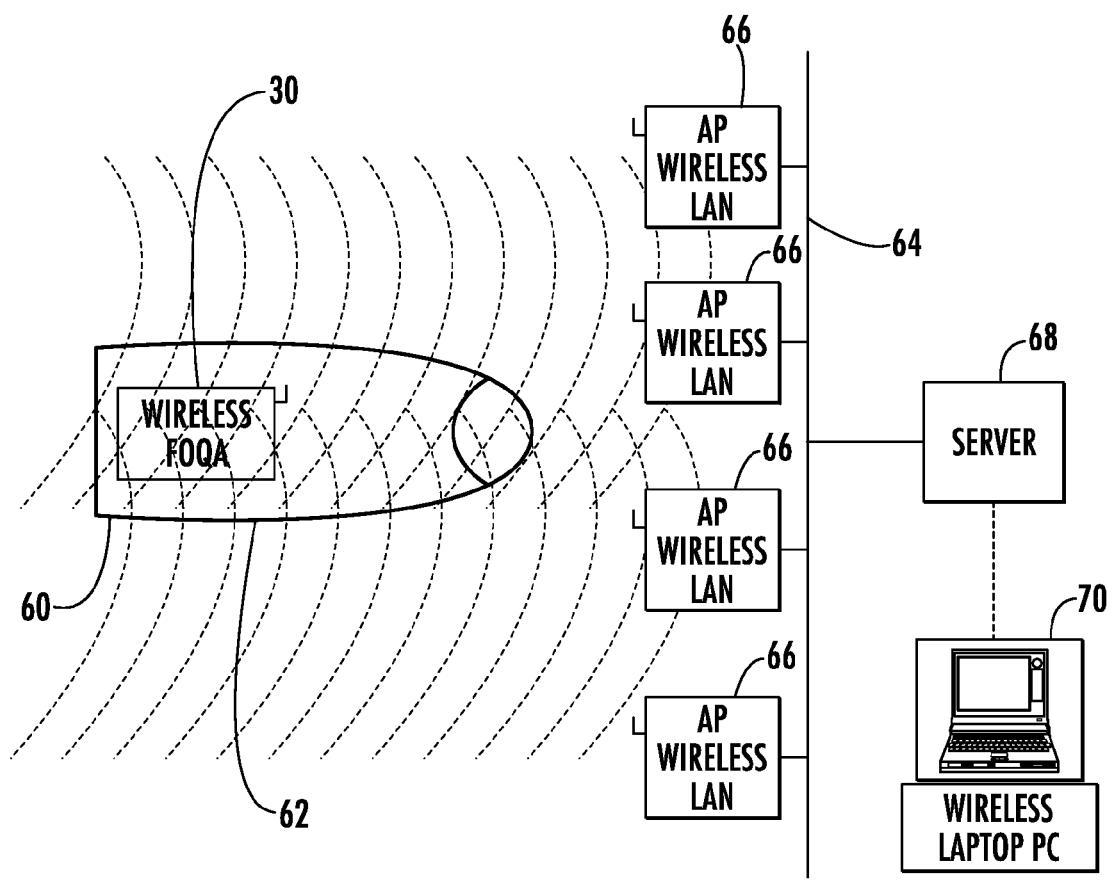
FIG. 4 is a fragmentary, partial block diagram of an aircraft having the PC card of the present invention connected into an aircraft component, and wirelessly transmitting aircraft data along a radio frequency communications signals into the skin of the aircraft, which radiates the radio frequency communications signals to a wireless local area network (LAN) access point (AP) to be processed at a server and processor.

FIG. 4 shows an aircraft 60 with the wireless PC card 30 of the present invention incorporated with the DAU 20. The PC card 30 transmits aircraft data along a radio frequency communications signal into the skin 62 of the aircraft fuselage, which radiates the radio frequency communications signal to a location remote from the aircraft. In the present illustrated example shown in FIG. 4, the signal is transmitted to a wireless local area network having multiple access points 66 acting as receivers that connect into a server 68, for example, a baggage server, and into a processor 70, for example, a wireless laptop PC, which allows processing of the aircraft data that is received from the aircraft. For example, the aircraft data could be data relating to what luggage is stored in the aircraft. That luggage data is transmitted to the DAU 20 or another aircraft component. The PC card 30 of the present invention extracts the aircraft data and stores it in memory 40. The CPU 42 reads the aircraft data from the PC card memory 40, forwards the aircraft data to the transceiver 32, which transmits the aircraft data to the skin of the aircraft. The radio frequency communications signal is reradiated (or radiated) from the aircraft skin as a passive antenna to receivers on the ground as access points of the local area network.

Because the PC card 30 of the present invention has a receiver 32b as part of its transceiver 32 function, data can be uploaded, including control signals for specifying which portions of data are to be retrieved from the aircraft component and transmitted. Also, because the PC card of the present invention has a desired form factor, for example, a Type III PCMCIA form factor, the PC card can be connected into other PC card slots for different aircraft components, including PC card slots that may be positioned on the aircraft engine, in the cockpit, in the cargo compartment, or in the main passenger seating area.

Figure 5:
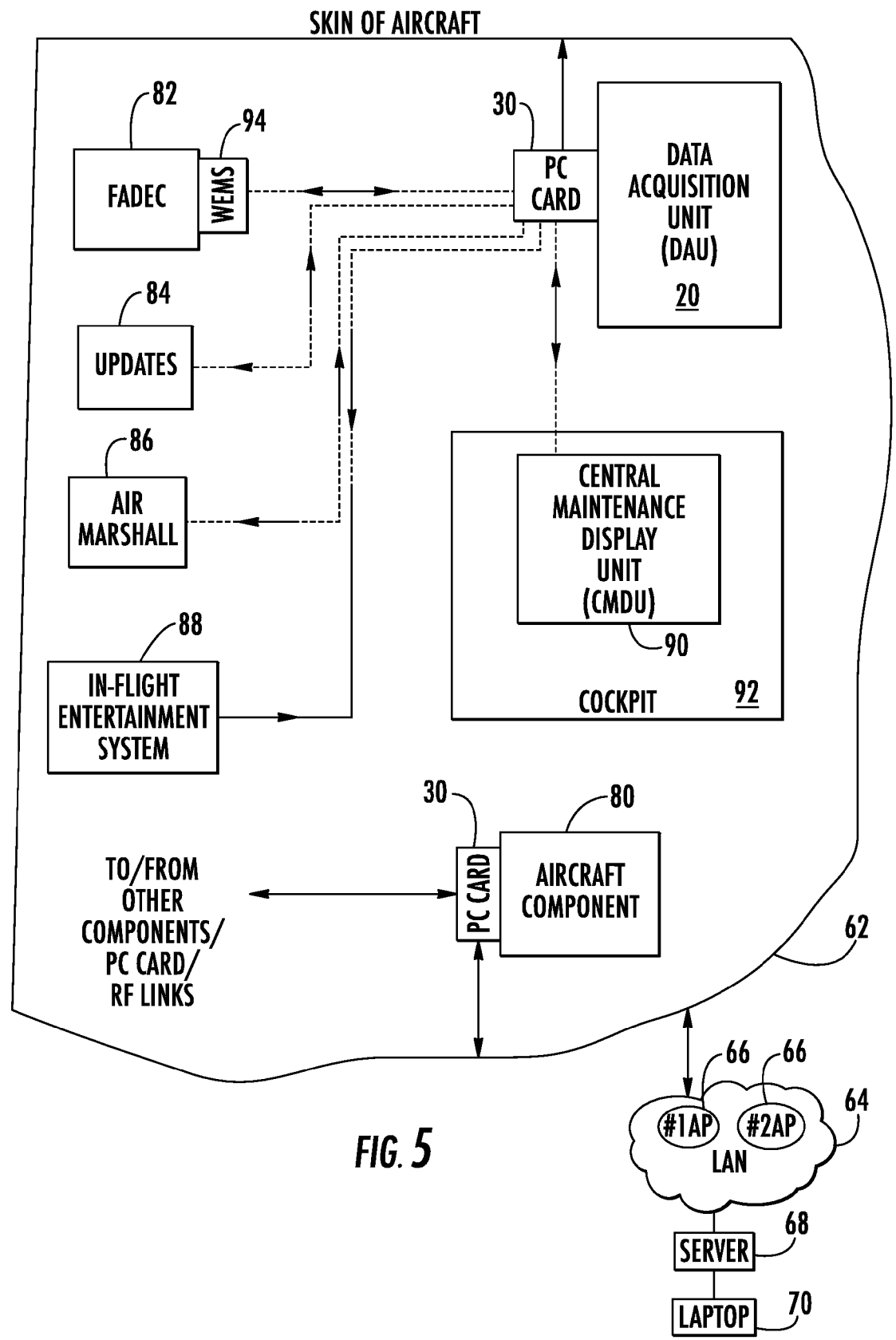
FIG. 5 is a block diagram showing various aircraft components that can be interfaced with the PC card of the present invention.

FIG. 5 shows different aircraft components. For example, the DAU 20, and a second aircraft component 80, both receive the PC card 30 of the present invention. Data could be retrieved from a FADEC 82, software updates 84, an air marshall 86, or in-flight entertainment system 88 using the PC card of the present invention, depending on which aircraft component it is coupled. Signals could be received from an air marshall 86 who is stationed on an international or other domestic flight, and later transmitted to the ground or directly to the cockpit using the PC card of the present invention, for example, interfaced to the ADU or other aircraft component. Aircraft data could also be transmitted to a Central Maintenance Display Unit (CMDU) 90 that indicates in real-time the health and status of aircraft systems. The CMDU 90 could be located in the cockpit 92 to allow the pilot to view real-time health and status data.

The aircraft data could also comprise flight performance data or aircraft engine data received from a WEMS module 94 mounted on the FADEC 82. An example of a WEMS module is disclosed in commonly assigned U.S. patent application Ser. No. 10/774,578, filed Feb. 9, 2004 (U.S. Pat. No. 6,943,699), entitled "Wireless Engine Monitoring System," the disclosure which is hereby incorporated by reference in its entirety. Also, the aircraft data could be related to at least one of aircraft contents, passenger data, aircraft departure and arrival, or passenger transactions. Aircraft data could also be received from a hand-held unit, such as disclosed in the incorporated by reference '010 patent. Data can be transmitted to the flight deck if applicable.

It should be understood that the PC card 30 of the present invention can have other functions because it includes a transceiver for receiving data for on-board processing. This received data could be instructions for varying the power or frequency of a transmission. Also, various audio, video and navigation files could be uploaded and transferred from the PC card into an aircraft component, for example, an in-flight entertainment file server or the DAU, and then into other aircraft systems.

The PC card of the present invention can also be operative for transmitting aircraft data at a first higher data rate when the aircraft is on the ground, and a second, substantially lower data rate when the aircraft is airborne in close proximity to an airport, for example, as disclosed in the above-identified and incorporated by reference '681 patent. It is also possible to transmit over a plurality of sub-band frequency channels where the frequency can be chosen based upon the position of the aircraft determined by an on-board global positioning system, as disclosed in the above-identified and incorporated by reference '238 patent. Flight management data can also be uploaded. The PC card 30 of the present invention could include the functions as disclosed in the incorporated by reference patents.

The PC card 30 of the present invention is also advantageous because it wirelessly transmits aircraft data from the aircraft without requiring an external antenna mounted on the fuselage. It has been found that the aircraft skin can be used as a passive radiator. As a result, it is possible to shorten the time and decrease the effort used in the recovery of aircraft data for off-site analysis. Experimental results have shown the advantages of this system and method.

Referring now to FIGS. 6-12, there are illustrated further details of how the WEMS module 94 can interoperate with the PC card 30, which in turn, interoperates with a cabin wireless LAN unit (CWLU) 532 to facilitate transmission of engine data for transmission in real-time through a satellite connection or UHF connection. The WEMS module 94, PC card 30 or another processor at the flight deck, for example, may parse engine data received from the WEMS module or other data obtained from the Data Acquisition Unit 20. There now follows details of the WEMS module 94 and details of the cabin wireless LAN unit 532, such as disclosed in commonly assigned U.S. Pat. No. 9,026,273, the disclosure which is incorporated by reference in its entirety.

Figure 6:
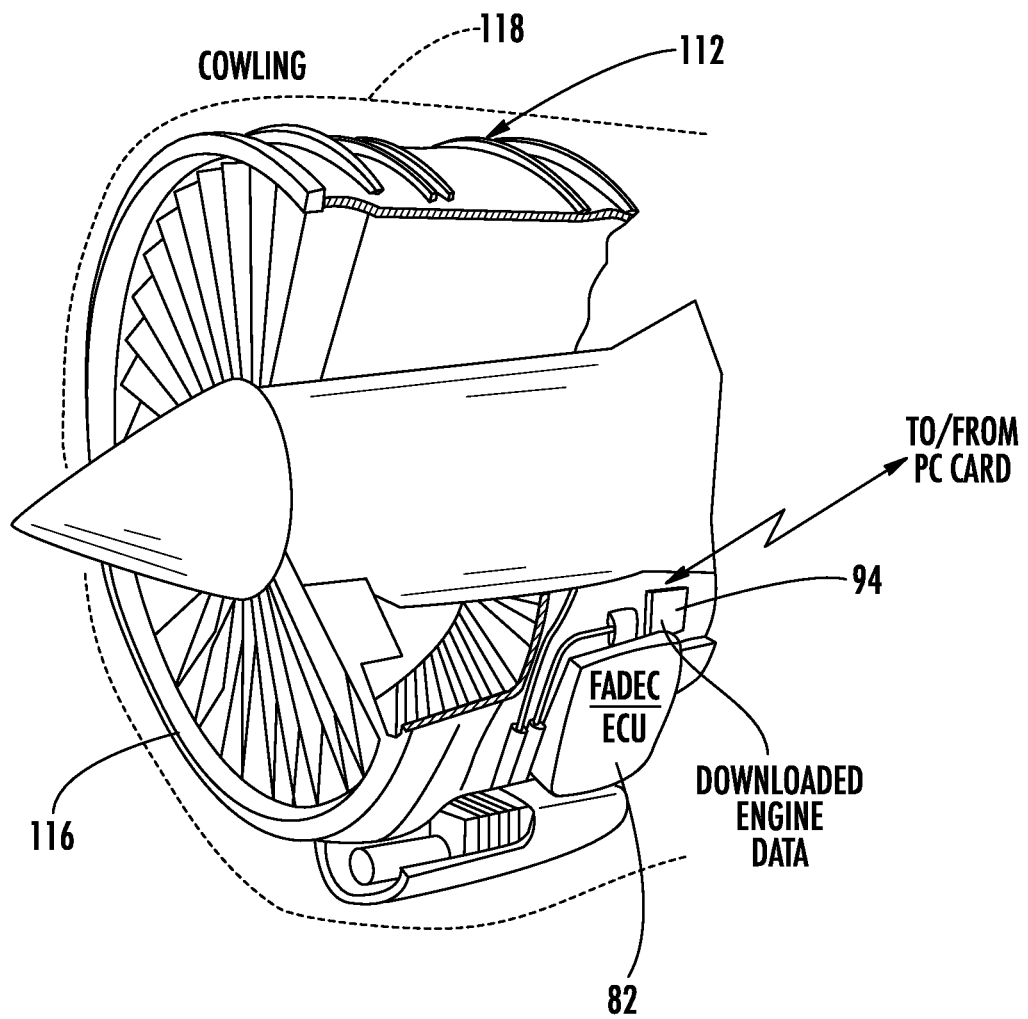
FIG. 6 is a partial fragmentary, isometric view of a jet engine showing the FADEC/ECU and the WEMS module for transmitting the engine data to the PC card in accordance with a non-limiting example.

FIG. 6 illustrates a WEMS module 94, in accordance with a non-limiting example, that is mounted directly on the jet engine 112 and electrically connected to the FADEC/ECU control unit 82, which is also mounted on the jet engine. The jet engine 112 shows basic elements of the turbine 116 and other components. The jet engine cowling/nacelle 118 is shown in dashed lines and the WEMS module 94 is disposed within the cowling. The WEMS module 94 includes basic functional RF and memory components as described below. The WEMS module 94 can be mounted at different locations on the engine depending on the type of preferred conformal antenna and the nature of the cowling 118 used in the jet engine.

Figure 7:
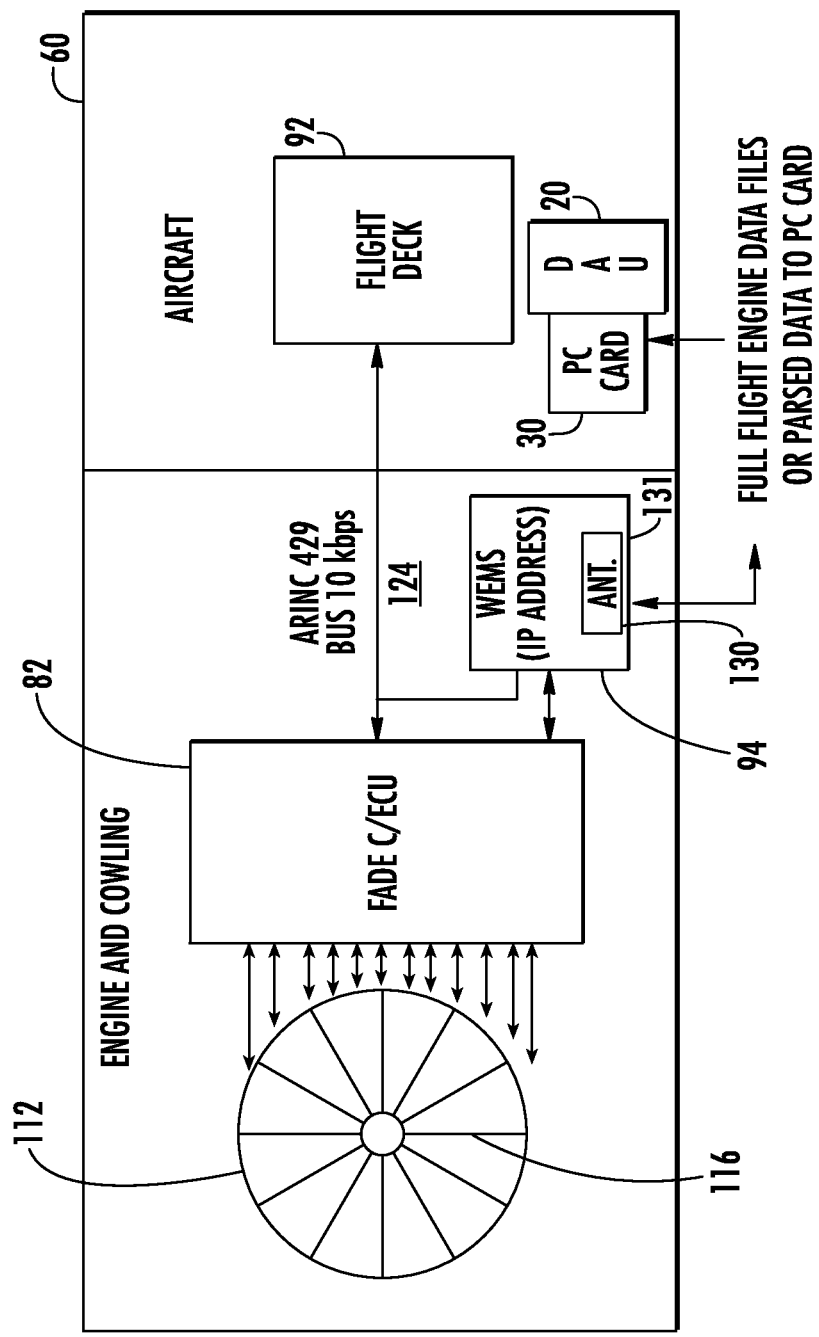
FIG. 7 is a block diagram showing the WEMS module of FIG. 6 communicating with the PC card in accordance with a non-limiting example.

FIG. 7 shows a basic block diagram of a FADEC/ECU 82 that is operative as a bidirectional multiplexer for signals to and from the jet engine 112. The signals include analog and digital signals and the FADEC/ECU 82 gives commands to the engine from the flight deck 92 of the aircraft 60. It also transmits engine status and health signals. Many signals are processed by the FADEC/ECU 82, which transmits the signals over an ARINC 429 bus 124 in this non-limiting example at typically 10 kilobits per second to and from the flight deck 92.

The WEMS module 94 in one example includes a separate data address as an IP address (for each module), which is linked to the serial number of the engine. The WEMS module 94 is mounted on the jet engine 112 and interfaces with the FADEC/ECU such as through another port on the FADEC/ECU or directly into the ARINC 429 bus 124. The radio frequency transceiver capability is built into the WEMS module 94 and is operative for recording, compressing and encrypting full flight data files. It typically will use a conformal antenna 130 that is formed in one example as a small patch antenna the size of a postage stamp, for example, mounted on a casing 131 that forms a protective housing for the WEMS module 94. Although a conformal antenna is preferred, a separate antenna could possibly be used depending on the cowling and engine type on which the WEMS module 94 is mounted. A separate antenna could be mounted on a separate location on the fuselage or other location for enhancing communication.

The WEMS module 94 can use an archival data store for recording, storing and encrypting and then later transmitting "full flight" engine data or via a processor selectively parse engine data for transmission in real-time and in an example as mini reports over a satellite connection to a ground station for analysis. As illustrated, the WEMS module 94 will transmit directly to the PC card 30 for transmission to a CWLU. The WEMS module 94 can record hundreds of engine parameters with a preferred one second sampling frequency in one example. The WEMS module thus allows advanced prognostic and diagnostic techniques to increase engine "time on wing" (TOW) and decrease engine maintenance costs. For example, the WEMS module 94 could be operative with jet engine diagnostic cells, such as used with prognostic and health management applications, including those designed by Impact Technologies, LLC of Rochester, N.Y. The WEMS module 94 can download engine data by almost any type of radio frequency signal, including spread spectrum modulation techniques. The WEMS module 94 could be operative with cellular, internet, or PSTN communication infrastructures to download full flight engine data files and upload algorithms or other data or programs. Each WEMS module will typically include a separate Internet Protocol (IP) address such that it can be separately addressable for identification and upload and download of data.

In the embodiments shown relative to FIGS. 6-12, the WEMS module preferably will transmit the "full flight" engine data or in other examples parsed engine data to the PC card 30, which in turn, will transmit while the aircraft is in the air to the CWLU and via UHF or a satellite data unit for real live streaming. The parsed engine data may correspond to selected segments of engine data such as from selected engine components or selected time periods.

Figure 8:
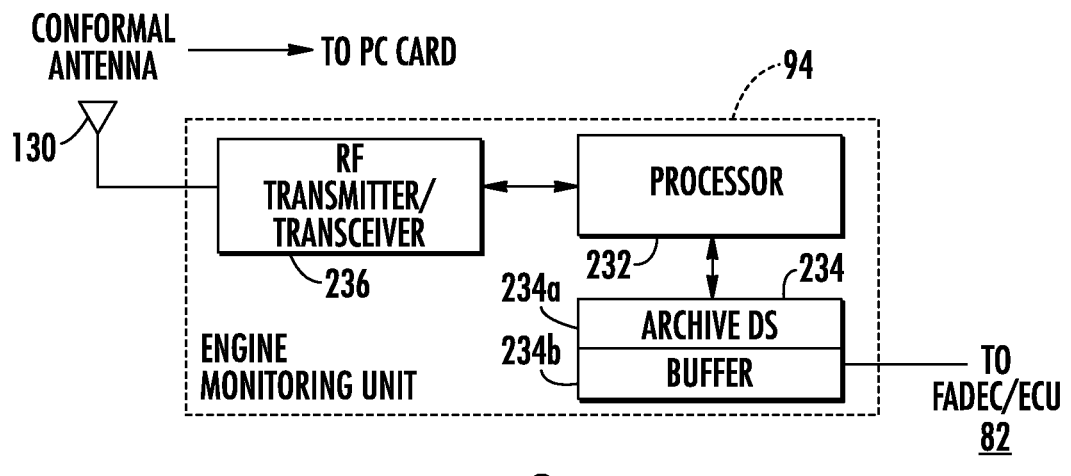
FIG. 8 is a block diagram showing basic components of the WEMS module of FIG. 6 in accordance with a non-limiting example.

As described briefly above, and as diagrammatically illustrated in FIG. 8, the WEMS module 94 includes a housing and bidirectional wireless (radio frequency carrier-based) subsystem containing a processing unit such as a microprocessor 232 and associated memory or data store 234, serving as both an archival data store 234*a* and a buffer 234*b* for communications, including packet communications. The memory 234 is coupled to the FADEC/ECU. Processing unit 232 can receive and compress the engine data and store the compressed data in its associated memory 234 and/or parse the engine data for making mini reports of selected parameters. A report can be generated by the processing unit 232, which includes many items of engine data or parsed engine data.

The engine data and/or reports can be downloaded via the RF transceiver 236 and its preferred conformal antenna 130. To provide bidirectional RF communication capability, the transceiver 236 is operative with the PC card 30 in this example to upload and download data. In this example, the RF communications link may be spread spectrum, and an 802.11 link, each of a plurality of sub-band channels of an unlicensed 2.4-2.5 GHz S-band segment of interest, in a non-limiting example, can be available and preferably used. Other unlicensed or licensed bands could be used.

Figure 9:
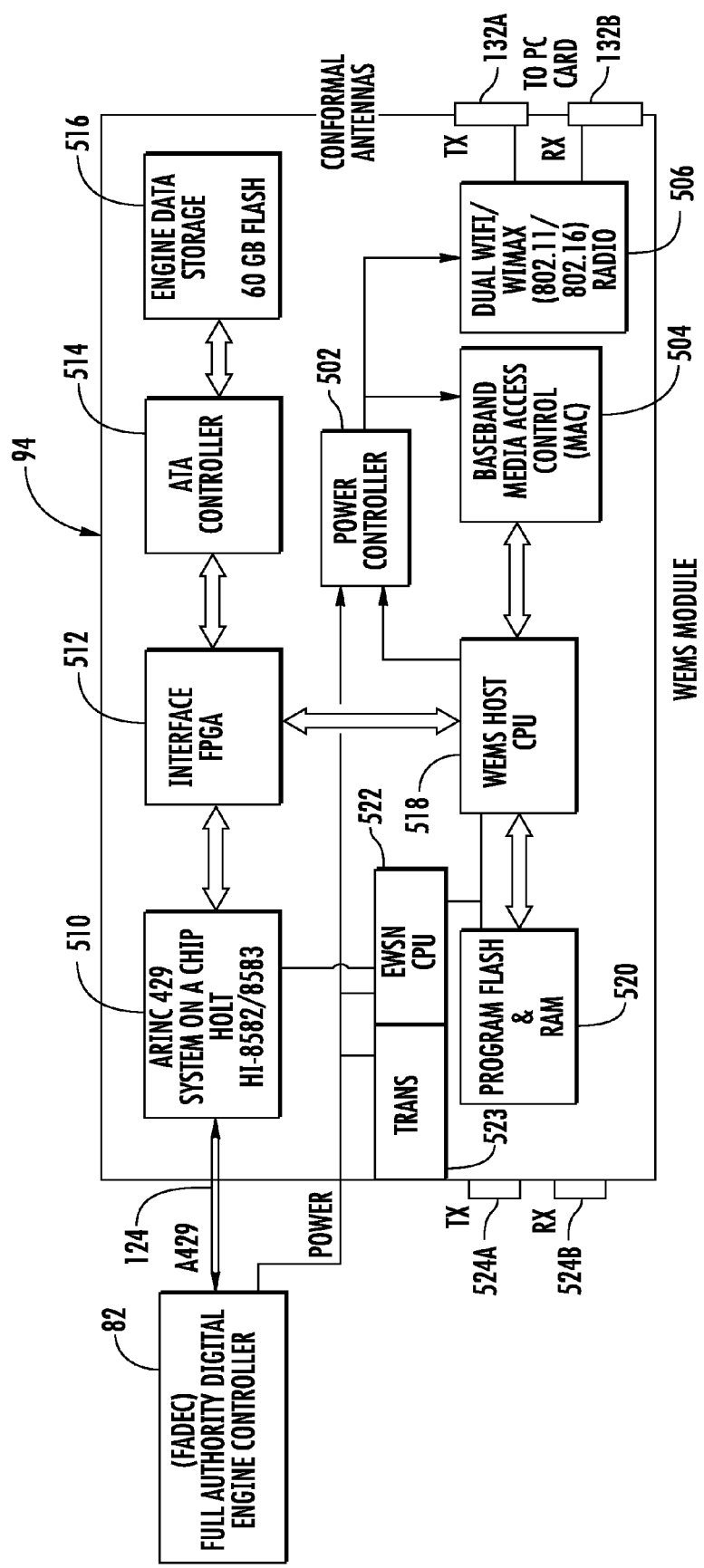
FIG. 9 is a block diagram showing greater details of the WEMS module in accordance with a non-limiting example.

FIG. 9 is a block diagram of the WEMS module 94 similar to that shown in FIG. 8 and showing greater details of different components and subcomponents that can be used in accordance with a non-limiting example. The FADEC 82 interfaces with the WEMS module 94 and provides power to a power controller 502 in the WEMS module that interoperates with a baseband Media Access Control (MAC) circuit 504 and dual WiFi/WiMAX radio 506, which in turn operates as a transceiver in accordance with 802.11 and 802.16 standards. This transceiver (radio) 506 could operate with other standards, however, to transmit and receive data through the conformal antennas, which in this example, correspond to a transmit (Tx) conformal antenna 132*a* and receive (Rx) conformal antenna 132*b*. The FADEC 82 communicates over the ARINC 429 bus 124 with a processor 510, which in this non-limiting example corresponds to a system on a chip (SOC) such as a Holt HI-8582/8583 integrated circuit chip. This chip interoperates with an interface Field Programmable Gate Array (FPGA) 512, which interoperates with an ATA controller 514 and engine data storage 516, for example, a 60 GB flash memory. The interface FPGA 512 interoperates with a processor as a WEMS host CPU 518, which in turn, interoperates with the program flash and RAM 520 and the baseband media access control circuit 504. An associated Engine Wireless Sensor Network (EWSN) Central Processing Unit (CPU) 522 and transceiver 523 can act as an interrogation unit and receiver for wireless network sensors as explained below. The transceiver (radio) 523 can transmit and receive data through conformal antennas, such as the example illustrated at transmit (Tx) conformal antenna 524*a* and receive (Rx) conformal antenna 524*b*.

In this example system, no aircraft modification is required and no manual intervention is required after the WEMS module 94 is installed on the aircraft engine except if no PC card 30 is present, then to insert the appropriate PC card into a slot on the DAU 20. As indicated below during flight, the WEMS module acquires, stores and encrypts "full flight engine data" or parsed engine data and can automatically and wirelessly download engine data during flight to the PC card 30 or post-flight. The WEMS module 94 can acquire significant quantities of data during flight and provide global "real-time" downloading of that acquired engine data such as using a communications protocol in conformance with ARINC 429 and to the PC card 30. This is a technical standard for the avionics data bus used on most higher-end commercial and transport aircraft as a two-wired data bus and data protocol to support an avionics local area network (LAN). It is a self-clocking and self-synchronizing serial data bus with a transmit and receive on separate ports. The twisted pair wires provide for balanced differential communications signaling.

Each ARINC communications packet typically has a 32-bit value and five fields, including a parity bit, a sign/status matrix (SSM) to indicate whether a data field is valid, a normal operation (NO) to indicate that data in the word is considered to be correct data; a functional test (FT) to indicate that data is provided by a test source; a failure warning (FW) to indicate a failure that causes the data to be suspect or missing; and a no computed data (NCD) to indicate that data is missing or inaccurate. The SSM as a sign/status matrix can indicate the sign of the data or other orientation such as north/south or east/west. The ARINC 429 system on a chip circuit 510 such as the Holt integrated circuits HI-8582 or HI-8583 is a silicon gate CMOS device that interfaces a 16-bit parallel data bus directly to the ARINC 429 serial bus 124. The ARINC 429 processor 510 includes two receivers each with label recognition, 32×32 FIFO and an analog line receiver. Up to 16 labels can be programmed for each receiver.

Figure 10:
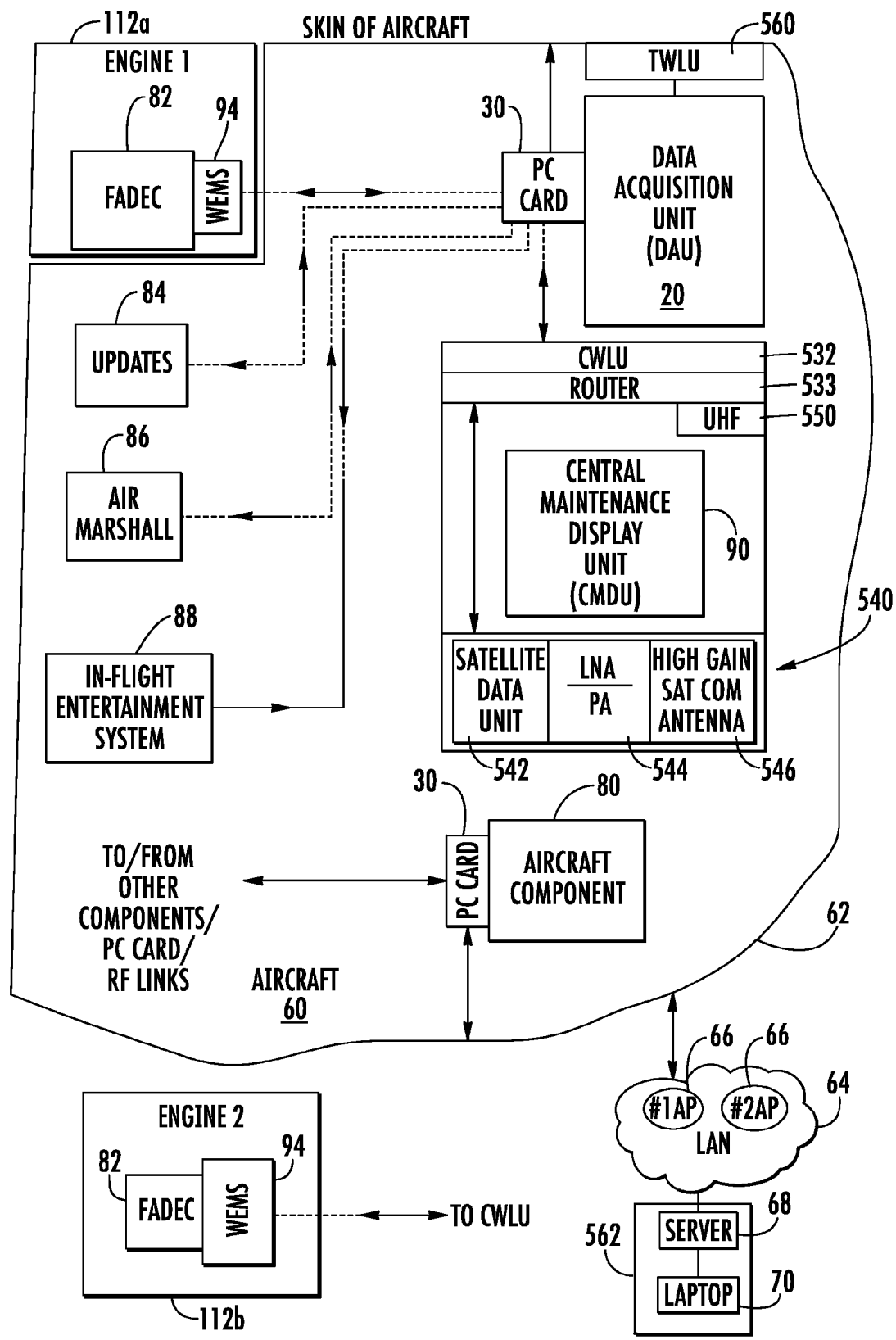
FIG. 10 is a block diagram showing the various aircraft components that can be interfaced with the PC card, including the full flight engine data or parsed engine data from the WEMS module in accordance with a non-limiting example.

FIG. 10 shows greater details of the flight deck or cockpit 92 that includes the Central Maintenance Display Unit (CMDU) 90 and also includes the Cabin Wireless LAN Unit (CWLU) 532 as a communications unit that operates as an access point and receives the engine data via the WEMS 94 and PC card 30 that is either full flight engine data or parsed engine data and other data such as from the ACV. The data acquired from the digital flight data acquisition unit 20 can include the aircraft data. CWLU 532 includes a typical access point processor and transceiver and may route data through a router 533 to a UHF transceiver 550 or to a satellite communications unit 540 that includes a satellite data unit 542, low noise amplifier/power amplifier (LNA/PA) 544, and high gain satellite communications antenna

546. Also, greater details are shown of two engines 112a, 112b as engine 1 and engine 2 each having the WEMS module 94 connected into the FADEC 82. The data acquisition unit 20 also interconnects into a Terminal Wireless LAN Unit (TWLU) 560, which may act as a wireless access bridge from the aircraft LAN as part of the CWLU 532 to a ground based LAN for a "gate link" application.

Figure 11:
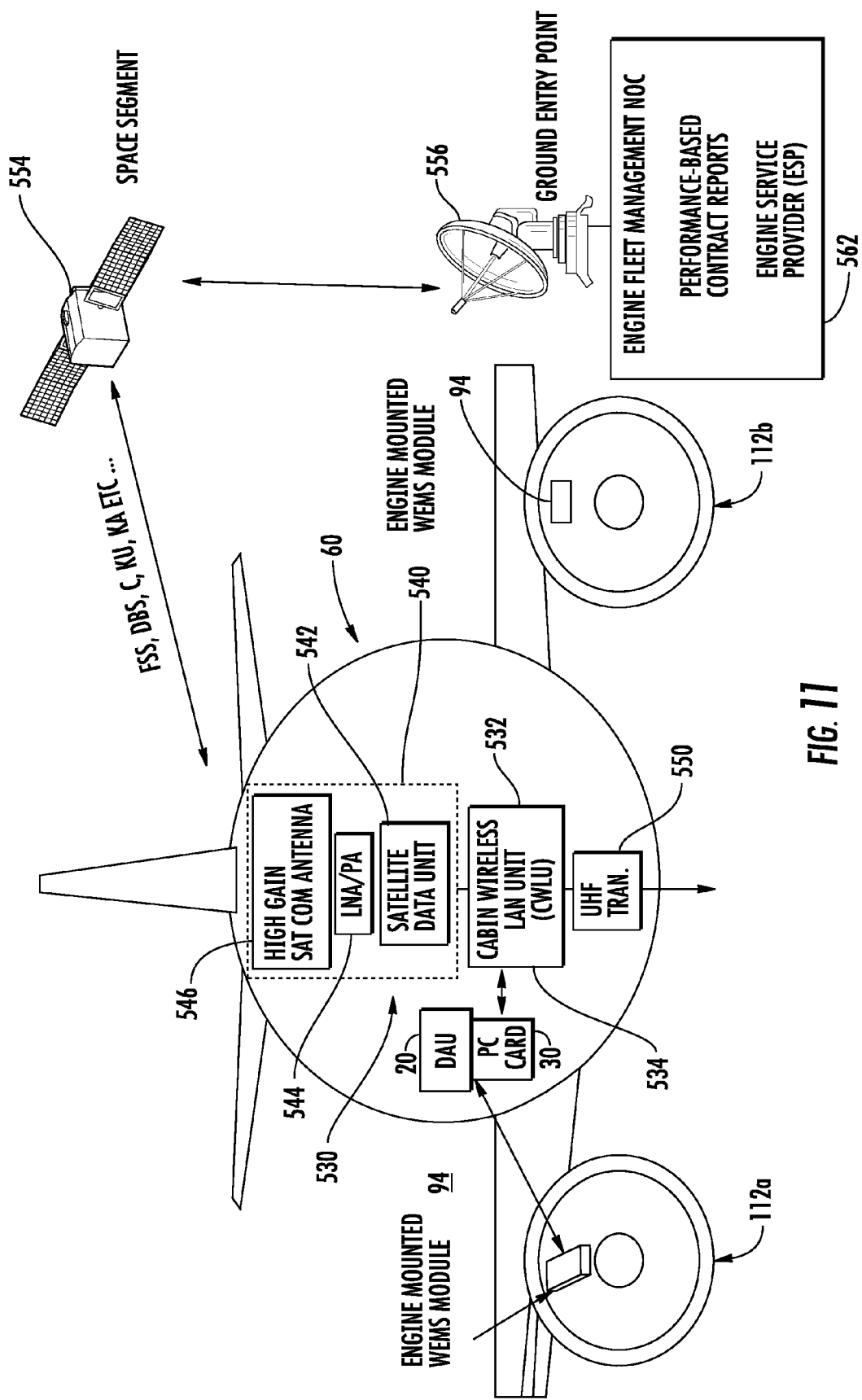
FIG. 11 is a partial fragmentary view of an aircraft and its engines, showing the engine mounted WEMS modules that wirelessly communicates data to the PC card and CWLU in accordance with a non-limiting example.

FIG. 11 illustrates a fragmentary sectional view of an aircraft 60 and two aircraft engines 112a, 112b, each having an engine mounted WEMS module 94 in accordance with a non-limiting example. The aircraft 60 includes the flight deck 92 and central maintenance display unit 90 and the cabin wireless LAN unit (CWLU) 532 that operates as a wireless access point and receives communication signals from the PC card 30 and WEMS module 94. The CWLU 532 may be positioned in the cabin, flight deck, or in the fuselage. The CWLU 532 interoperates with a satellite communications unit 540 that includes the satellite data unit 542, the low noise amplifier/power amplifier (LNA/PA) 544 and high gain satellite communications antenna 546. These components form a second wireless transceiver for a satellite communications link. The CWLU 532 also interoperates with a UHF transceiver 550 that can be used for air-to-ground communications such as the older Air-to-Ground Radiotelephone bands used on aircraft. The UHF transceiver also operates as a second wireless transmitter. Multiple hop communications is illustrated using the WEMS module 94, CWLU 532, and a satellite 554, which communicates with a ground entry point 556 user satellite dish such as a satellite receiving dish that receives data for an engine service provider (ESP) 562.

During flight, the WEMS module 94 wirelessly connects to the PC card 30, which transmits engine data and other data from the DAU 20 to the cabin wireless LAN unit 532. Using the UHF or satellite communications, the CWLU will download critical "in flight engine safety data" to the ESP 562 on the ground or have its on-board processor analyze the data such as for parsing the data. The PC card CPU 42 (FIG. 2) as its processor can process and parse data. This data can support FAA ETOPS (Extended Twin Operations) for oceanic routes. The satellite communication link provides "real-time" engine data transfers and supports critical engine decisions at the ESP 562 or on-board, including "in flight engine shut downs" to determine if one of the engines should be shut down. Real-time analysis of aircraft engine data can be accomplished at the engine service provider 562, including performance-based contract reports for engine diagnostics, health and status of an aircraft engine, performance burns, time on wing and the environmental impact (carbon emissions) or on-board the aircraft. Satellite communications can include different communications signaling and protocols, including Direct Broadcast Satellite (DBS), the Fixed Satellite Service (FSS), Ku, Ka and C band communications.

Alternatively, the UHF transceiver 550 can be used for communications at 848-850 MHz and 894-896 MHz as part of the older telephone band that can connect to the terrestrial ground system. The system allows significant "high value" and "time critical" data to be downloaded during flight and provides global "real-time" downloading of engine data and data obtained from the PC card 30 and DAU 20.

The WEMS module 94 interfaces with resources commonly available on international flights via the PC card 30 and DAU 20 in this example, including the WiFi cabin wireless LAN unit 532 in accordance with non-limiting examples operating under the ARINC 763 standard, which applies to servers on board commercial aircraft, allowing a passenger to have an "office in the sky." Access can be provided to the airborne satellite communications that operate in accordance with the ARINC 741 standard using the satellite data unit 542 and other components as described. Airlines can now more closely monitor aircraft engine performance including meeting TAW ETOPS certification requirements that apply to twin engine aircraft on routes with diversion times more than 60 minutes using one engine and applies on routes with diversion times more than 180 minutes for airplanes with more than two engines. ETOPS is the acronym for Extended Twin Operations as defined by the U.S. Federal Aviation Administration (FAA) and allows the twin-engine airliners such as an AirBus A300 or Boeing 737 and up to Boeing 787 to fly the long distance routes that were previously off-limits to twin-engine aircraft.

The WEMS data from the WEMS module 94 and other data from the DAU 20 as real-time aircraft engine data allows a flight crew or ground based personnel or an analytical algorithm of the ESP 562 to make a decision to do an in-flight check-up and if necessary shut down or adjust the engine thrust of an engine. It is also possible for a maintenance worker to come on board the aircraft after landing and physically remove the PC card 30 from the DAU 20 instead of waiting for download via the PC card or cabin wireless LAN unit 532. This is advantageous if download capability is limited or non-existent depending on the airport and other conditions. Also, the PC card 30 may parse not only engine data, but data from the DAU 20. Algorithms can be uploaded in real-time from an engine service provider 562 or other server during flight of the aircraft using the satellite communications or UHF transceiver 550. The algorithms could include analytical algorithms for parsing engine data or other data from the data acquisition unit if a problem had been ascertained from some downloaded data during flight to obtain better control over engine or other aircraft component analysis. This could include changing engine sampling of various sensors and other parameters. The algorithms could be based on different jet engine performance during flight, including changes in the amount of fuel that is burned in each engine. Several terabytes of data may be downloaded to the WEMS, but the PC card 30 or other processor associated with the CWLU 532 or flight deck could parse that engine data together with the data from the DAU 20 and forward that data to a ground based ESP 562 during flight to determine if other algorithms should be uploaded and changes made in engine or aircraft operation. Mini reports could be generated by the WEMS 94 and/or PC card 30 and transmitted to the CWLU for real-time transmission and processing on ground or perhaps by another aircraft in certain instances.

It is possible to do DSP processing on parsed engine or other data. The amount of parsed data can be varied and transmitted from the aircraft based upon bandwidth limitations to and from the aircraft. For example, if there is wide bandwidth, then less data is required to be parsed and full flight engine data and much of the data from the Data Acquisition Unit 20 may be transmitted. Otherwise, selected data such as from specific wireless engine sensors can be parsed at the WEMS module 94 or PC card 30 or flight deck and later transmitted when bandwidth accommodates the transfer. Thus, filtering of data can be accomplished at the WEMS module 94, the PC card 30, and on the flight deck. Of course, depending on application, the fuselage can also be used as an antenna as later explained below.

It is possible for the PC card 30 to transfer data to the TWLU 560 in certain instances for a gatelink application. It is also possible to real-time stream maintenance operations data and forensic algorithms for the WEMS module 94 or other aircraft components on-the-fly such as for real-time tracking and other operations. Hundreds of maintenance inputs may be software configurable for the real-time maintenance stream not only on the engine via the PC card 30 and WEMS module 94, but also throughout the aircraft in association with the Data Acquisition Unit 20 and other components on the aircraft. This allows the Engine Service Provider 562 or other airline facilitator a real-time operation or performance of the aircraft even for smaller more minor items such as increasing fuel system efficiency and economy or preventing or determining if catastrophic aircraft and engine events may be occurring. The processing, such as at the WEMS module 94 or at the PC card 30 or other locations, allows real-time filtering of data. If there is a problem in one of the engines, that data can be transmitted over the communications link and operational algorithms or other messages received back for changing what data is parsed or looked at in greater detail, including changing sensors, sampling and other details. Different data that is in flight management computer can be transmitted and that data parsed. This may include the GSP operational data that can be downloaded periodically. Data may be streamed off the Data Acquisition Unit 20.

When the aircraft is on the ground, it is possible for a maintenance worker to wirelessly connect to the PC card 30 such as using their laptop 70 and download data or connect to the PC card 30 via the CWLU 532 and download data using WiFi for example, including parsing data for further analysis. It is also possible to connect through the TWLU 560 to obtain data from the PC card 30, which includes WEMS engine data in an example. A maintenance worker may upload dynamic algorithms for analyzing data and changing parameters during later flights.

Greater control can be made on when scheduled maintenance operations occur, including when an engine is removed. Usually an engine is removed because it has too many cycles, too much time on the wing or the temperature margin has been reduced. These are usually fairly predictable and these events are avoided because of the cost unless necessary. Having better control of data analysis before, during and after a flight will allow greater analysis of when an engine should be replaced. This is also advantageous since some engines may be replaced when the aircraft is in a remote location if initial data analysis determines if an engine is operating poorly, but if analysis of parsed or other data is made during flight such as from an Engine Service Provider 562, then a determination is made that the engine may not have to be replaced.

The customized algorithms could be uploaded that drill down and pull data apart to avoid the necessity of changing the engine. Thus, aircraft components and the WEMS module 94 can be configured on-the-fly, including changing data rate samplings and other details. Specific, customized big data analytic algorithms can be uploaded to the aircraft and into the WEMS module 94 via the PC card 30 and CWLU 532 via the satellite connection or UHF. Also because real-time streaming of data occurs, decisions can be made that some data should not be live streamed and only downloaded when the aircraft is on the ground. These are different options. It is also possible to make mini reports by phase of flight such as determining how much fuel is consumed during a phase. This can also be done using outside air temperature relative to phase of flight as to how sensed parameters and fuel efficiency change during not only phase of flight, but with changes in air temperature. The decisions to parse data and transmit more limited data may occur depending on price per bit of data depending on location of the aircraft and download conditions. The same decisions are made relative to uploading data. The decisions can also be made whether the latest generation satellite communications equipment is installed in the aircraft for use such as a KA band and determining what bandwidth is available. This may allow near real-time data to be transmitted since data can be parsed and even in low bandwidth satellite communications equipment some data can be transmitted in real-time. Thus, important real-time data can be transmitted back and forth while the aircraft is in flight.

Algorithms can be programmed into the WEMS module 94 or a processor at the flight deck or at a ground based ESP 562 to provide the processing via the PC card 30 to determine engine operating parameters based on the sensed engine data and determine if an in-flight shutdown should occur if certain engine operating parameters have been exceeded. Algorithms can be uploaded to the WEMS module 94 via the PC card 30 even during flight, allowing the WEMS module 94 to be configurable "on-the-fly." It is also possible to populate a request from the flight deck to the WEMS module 94 as to what exceedances are to be investigated and processed depending on environmental or other conditions. For example, it is possible to configure the WEMS module 94 to download only specific monitored parameters and data during flight instead of downloading a large amount of data. The WEMS module 94 is thus configurable as to data collection, storage and transmission. The WEMS module 94 is configurable and can be programmed by the flight deck or ESP. For example, if vibration occurs during flight, it is possible to increase the sampling frequency for various vibration sensors, while reducing the sampling frequency of other sensors such that more data is collected during flight concerning vibration statistics.

The WEMS module 94, in one example, operates in accordance with the IEEE 802.11 or IEEE 802.16 standards and is implemented with a Wireless Local Area Network (WLAN) 530 at a preferred 2.4 GHz frequency band. It also operates in the 3.6 and 5.0 GHz frequency bands. Over-the-air modulation techniques use the same basic protocol such as defined in the 802.11b and 8011 g protocols, typically using the 2.4 GHz ISM band, which divides each of the various bands into channels. For example, the 2.4000 through 2.4835 GHz band is divided into 13 channels that are spaced 5 MHz apart, with availability of the channels often regulated by each country. Thus, depending on worldwide geographical location of the aircraft, the WEMS unit 94 can communicate via its radio 506 on different channels and at different powers depending on jurisdictional requirements at the specific locale if downloading data on the ground and not through the PC card 30. Some of the channels can also overlap depending on local requirements. The data frames are typically divided into specific, standardized sections, which include a MAC header, payload, and frame check sequence (FCS). Different MAC headers and frame control fields can be used and subdivided into various subfields. These may be modified depending on the geographical location of the aircraft and local jurisdictional rule.

The 802.16 is a wireless broadband standard for a wireless metropolitan area network as a wireless MAN, commercialized under the name "WiMAX" (Worldwide Interoperability for Microwave Access). WiMAX standardizes the air interface and related functions with the wireless local loop. It requires a physical device layer (PHY) and operates with scalable OFDMA (Orthogonal Frequency Division Multiple Access) to carry data and support channel bandwidth between about 1.25 MHz and 20 MHz with about 2,048 subcarriers. It supports adaptive modulation decoding and an efficient 64 QAM coding scheme. In some instances, 16 QAM and QPSK can be used. The WEMS module 94, PC card 30, CWLU 532, and other associated components of the system may include Multiple-in, Multiple-out (MIMO) antennas to provide non-line-of-sight propagation (NOLS) characteristics for a higher bandwidth and a hybrid automatic repeat request (HARQ) for good error performance. The MAC sublayer can include a number of convergent sublayers that describe how the wire line technology such as Ethernet, Asynchronous Transfer Mode (ATM) and Internet protocol (IP) are encapsulated on the air interface and how data is classified. The advanced Encryption Standard (AES) or Data Encryption Standard (DES) can be used during data transfer for higher security. Various power saving mechanisms can be used, including a sleep or idle mode. The quality of service (QOS) can be supported by allocating each connection between a subscriber station and base station.

Figure 12:
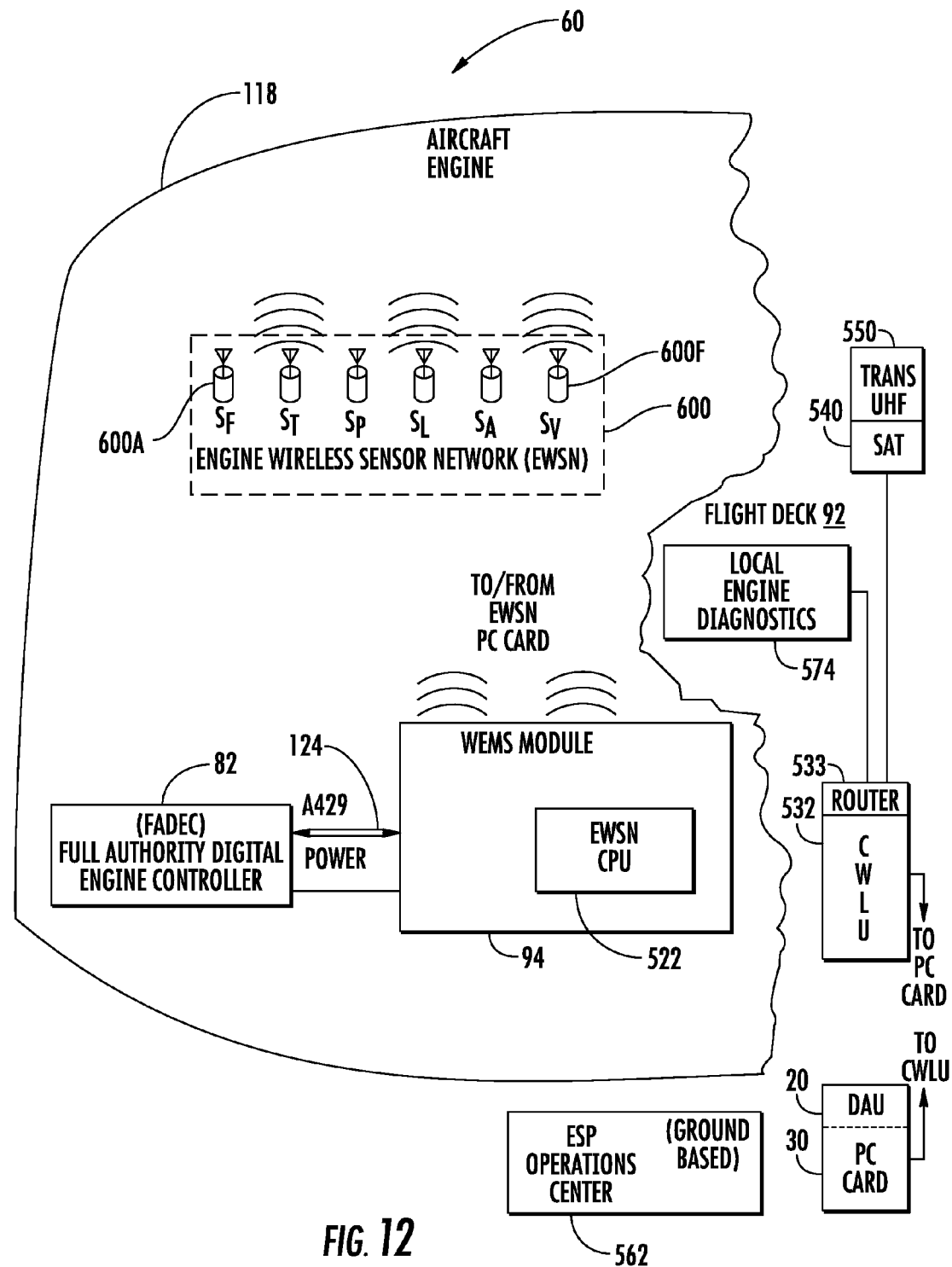
FIG. 12 is a block diagram showing a WEMS module that interoperates with the PC card and the Engine Wireless Sensor Network (EWSN) in accordance with a non-limiting example.

FIG. 12 illustrates how the WEMS module 94 can interoperate in a wireless connection with an Engine Wireless Sensor Network (EWSN) 600 that is formed by a plurality of different wireless engine sensors illustrated in this example as individual nodes 600a-f, to provide precise monitoring of the rotating subsystem such as the turbine blades and bearing assemblies in the aircraft engine, and gas path parameters such as temperature, vibration, strain and pressure. Although only six wireless engine sensors are illustrated, it should be understood that the engine wireless sensor network for one jet aircraft engine can include at a minimum hundreds of such wireless engine sensors. A separate EWSN CPU 522 (corresponding to the EWSN CPU in FIG. 9) at the WEMS module 94 can interoperate with the engine data received from different wireless engine sensors for communications and the sensor processor can configure the wireless sensors forming the EWSN to change sampling rates and interrogate sensors through an appropriate wireless transceiver that interoperates with each of the wireless engine sensors 600. The engine data received from the wireless engine sensors can be processed as explained above and aircraft components adjusted through the FADEC 82.

The WEMS module 94 not only interfaces to the FADEC 82 as illustrated in FIG. 12, but also to the wireless engine sensors that are configured to form the EWSN 600 and monitor the critical engine parameters. The EWSN topology can vary from a simple star network to an advanced, multiple hop wireless mesh network. Propagation between the hops and the network can be by routing or flooding. As shown in FIG. 12, various wireless engine sensors include a fuel flow sensor ($S_F$); temperature sensor ($S_T$); pressure sensor (Sp); level sensor ($S_L$); acceleration sensor ($S_A$); and vibration sensor ($S_v$). Each of the wireless engine sensors can include various transducers that are bidirectional and provide engine control. Each wireless engine sensor forms a wireless node that typically includes a sensing mechanism and includes a radio transceiver and antenna and a microcontroller (processor) and associated software and an energy (or power) source. This allows real-time detection and diagnosis for faults that can be alerted to a pilot.

The EWSN 600 interoperates with the WEMS module 94 and provides a cost effective method to monitor, detect and diagnose problems and targets mechanically stressed components within a turbine unit or other component of the engine. Use of the EWSN 600 also provides an opportunity for data fusion between the FADEC 82 and EWSN data sources to automatically and wirelessly forward data to the Engine Service Provider operation center 562 for post flight analysis and allow detection, diagnosis and prognosis of problems occurring within different turbine components. The data obtained from the EWSN 600 provides for early detection and diagnosis of turbine component faults and helps prevents catastrophic failures and allows real-time data acquisition for valuable engine operational, performance and design information. The flight deck can include the cabin wireless LAN unit 532 that includes a processor or other CPU 574 for local engine diagnostics.

The WEMS module 94 is beneficial for power generation design such that aircraft turbine designers benefit from data collected during continuous field operation of their engines. This allows for design improvements in the safety, reliability and efficiency of future engine systems. Mission critical networks (MCN) will also be able to explore related opportunities for the commercial aviation market based on data obtained by the WEMS module interoperative with the EWSN 600, which is a potential driver for future electronic enabled airplane health management (AHM) that is real-time, continuous and proactive. One beneficial opportunity is applicable to commercial/military helicopter technology with health and usage monitoring systems (HUMS).

Different wireless engine sensors can be used in the engine wireless sensor network 600, such as described in the commonly assigned U.S. Pat. No. 9,026,279, the disclosure which is hereby incorporated by reference in its entirety. Typically, each wireless engine sensor forms a wireless engine sensor node and provides a radio interface and processor capability. The wireless engine sensors can operate at 600 or more degrees Centigrade in the harsh environment of the jet turbine engine to measure strain, heat and gas. These wireless engine sensors are advantageous over wired sensors that are difficult, impractical or expensive and difficult to implement with rotating components that damage the wire leads, making wired sensors impractical in an aircraft engine. Some wireless engine sensors use a passive power source because battery power is not feasible. These wireless engine sensors are typically lightweight and conformal for use on different rotating and non-rotating surfaces and can operate inside the turbine jet engines without unbalancing the engine or disrupting the aerodynamics. It is possible for the wireless engine sensors to measure strain with 50 KHz variations and operate at even higher frequencies with modal vibrations that occur two to about three times the vane passing frequency. In one example, the wireless engine sensors are formed from surface acoustic wave (SAW) devices that operate in excess of 1,000 Degrees C., thus allowing them to be used for different wireless strain, temperature and sensing applications in severe radio frequency (RF) multipath and Doppler environments. In one non-limiting example, SAW sensors capture the RF energy from a resonant antenna structure during interrogation such as a signal emanating from the transceiver of the WEMS module to excite the different surface acoustic waves by piezoelectric coupling to a substrate material. Typically the acoustic waves are delayed between metallic reflectors in proportion to the strain experienced at that instant when strain is imparted, and thus, the strained sensing is intrinsic to the device. The reflected acoustic wave is re-radiated back into the RF domain and the now-modulated data signal is received by the remote RF interrogation unit such as by the transceiver at the WEMS module and process engine data through any associated EWSN CPU. Any differential time delay between the two strain reflectors is computed, for example, at the EWSN CPU in this non-limiting example based on the phase of the received signal. Any time span between the RF "data" and the "reference" signals is typically about 100-200 nanoseconds and thus a jet engine spinning at a high RPM is frozen in position when the data points are collected.

The advantages of the wireless engine sensors as described include the passive power feature with no complex circuitry failing at high temperatures together with the wireless technology that is small, lightweight and conformal to minimize the impact on engine performance.

It is also possible to have a passive, wireless engine sensor network 600 that uses a microwave acoustic sensor, for example, using acoustic wave technology as a bulk acoustic wave (BAW) device, film bulk acoustic resonator (FBAR), acoustic plate mode (APL) device, or a surface acoustic wave (SAW) device as described above. The SAW devices typically have a layer of metallic electrodes on the surface of the piezoelectric crystal and operate by transducing the electrical signal to electromechanical waves that propagate on the surface of the crystal. The piezoelectric crystals form under the application of the electrical signal. A SAW delay line can be used with input and output structures formed as a periodic interdigitated transducer (IDT) electrode structure with several wavelength periodicities. The synchronous operation of the IDT at the surface launches the electromechanical wave that propagates at, for example, $3\times10^3$ M/S with orders of magnitude slower than the propagation of an electromagnetic wave in a vacuum.

For this reason, the term "delay line" is also applied to the wireless engine sensors, typically a few millimeters to sub-millimeters long depending on frequency of operation from a few MHz to several GHz. Using an RF interrogating signal from the WEMS module, for example, the device is advantageously operating as a passive device. Batteries or other external power sources are thus not required. Different acoustic wave materials can be used such as quartz, lithium niobate, and lithium tantalate. Also, different piezoelectric crystals such as langasite can be used. The interdigitated electrodes used in the wireless engine sensors are typically high temperature and stable materials, for example, formed as $Pt/Rh/Zro_2$ electrodes in one non-limiting example. Different wireless interrogation systems can be incorporated in the WEMS module, or in a separate controller, which in turn interoperates with the WEMS module. The systems can include 15-bit coded transducers operating with CDMA communications technology and frequency-modulated continuous-wave or frequency-step continuous-wave sensors (FMCW or FSCW). A high-Q resonator response provides some system for sensing based on variation of the resonant frequency.

The wireless engine sensors as a network 600 can also use microelectromechanical systems (MEMS) technology. It is possible to use RF powered LC sensors and high temperature thermo-couples or even optical sensors. For example, a thermo-couple can measure temperatures up to 2,300° C. An RF powered LC temperature sensor can use a high-K temperature sensitive ceramic material to realize LC tank temperature sensing with a high-K temperature sensitive ceramic material. It is an inductively powered system that generates a time varying electromagnetic field where any temperature data as the resonant frequency is transmitted to a reader corresponding to the WEMS module through an inductive link of its transceiver in one example. The resonant frequency of the remote reader changes when the capacitance of the wireless engine sensor changes and responds to the various environmental variables such as the temperature. A wireless engine sensor can be formed as a ceramic multilayer capacitor integrated with a planar inductor that forms the LC resonant circuit. The capacitance of the sensor is a function of the electric constant of the sensitive material and the planar configured capacitor has a linear dielectric constant variation with temperature.

The wireless engine sensor could be formed as an inductor with a lead-lanthanum-zirconate-titanate (PLZT) ceramic capacitor having temperature dependent characteristics. It can include an inductor-capacitor (L-C) tuned electronic oscillator that incorporates the temperature sensitive materials with a change in the value of the capacitance due to the temperature variation translated into modulation in the oscillator frequency. This results in the change in electric field that affects the frequency of the resonating harmonic response. The transceiver at the WEMS module (or a separate reader device interfaced with the WEMS module) detects the temperature changes by monitoring the impedance across the terminals of the antenna as part of a sensor node. It can use a ceramic coated with a conductive layer of NiCr and a parallel plate temperature sensing element design that incorporates a thick film high-K temperature sensitive ceramic material and thick film electrode to make sensor easy to attach and use on rotating components.

Different wireless engine sensors as the network 600 may be formed as a temperature sensor, pressure sensor, vibration sensor, proximity sensor or position sensor with appropriate signal conditioning circuitry. A communications module could implement communications using a BFSK (binary phase shift key) modulation and frequency hopping spread spectrum (DHSS) multiple access with a digital data interface, frequency synthesizer, and transmitter and receiver. Microprocessor and programmable logic can be included as a communications protocol stack implementation. Each wireless engine sensor as a node could transmit its own power capability data in order to receive power data from one or more other sensor nodes and can determine an optimum data transmission route through a wireless sensor communication network. Typically a data transmission route would be through the wireless sensor node or nodes that have the greatest power capability. Some power routing can be implemented with one of at least ad-hoc, on-demand distance vector routing protocol (AODD), dynamic source routing (DSR) and global state routing (GSR). Each wireless engine sensor node could also transmit data representative of its position and if in a fixed position that position data will be a constant. If the wireless engine sensor is located on a rotating component, then the sensor position would change, and the position data would be preferably transmitted simultaneously with the sensor data and power capability data. It is possible to use any received identification data to determine if a wireless engine sensor node transmits identification data as a member of the network. Each wireless engine sensor node could be assigned a given access time to the network similar to a TDMA system. It is possible to use a vibration-powered generator as part of the power supply that is driven by engine vibration and converts mechanical power to electrical power. Different power scavenging mechanisms can be implemented using MEMS technology to make the nodes as small as possible.

As noted before, the WEMS module 94 includes an EWSN CPU 522 as shown in FIG. 12 that could be remotely configurable by a processor in the WEMS module 94, on the crew or a processor at the flight deck, or by the Engine Service Provider operations center 562. The ESP operations center 562 can also transmit instructions to the EWSN 600 via the WEMS module to vary sampling rates on specific wireless engine sensors. The sampling rates are programmable for each of the different wireless engine sensors to permit programmable sensor monitoring, provide detection and diagnosis of faults and allow intelligent maintenance for "real-time" monitoring of critical engine parameters using "customized sampling."

Use of the EWSN 600 in conjunction with the WEMS module 94 provides for improved monitoring of reduced thrust take-offs to the minimum required for safe take-off because different wireless engine sensors can be sampled at a greater rate, for example, at take-off and thrust could be adjusted. On some occasions when the full thrust would be more than safely required such as for lower weight flights, long runway or head wind, it is possible to choose a thrust setting below the full thrust by telling the engines via the FMC (Flight Management System) that the OAT (Outside Air Temperature) is much higher. Temperature control using the EWSN is beneficial and various take-off tables can be used as assistance.

Typically the exhaust gas temperature (EGT) margin refers to the buffer between the engine's normal operating EGT temperature and its maximum EGT, i.e., the temperature at which it must be inspected, overhauled or replaced. A higher EGT is an indication of the HPC wear that can cause compressor stall. Different variables can be measured such as flow through a fuel metering valve, a variable bleed valve, variable stator vein, the fan speed ($N_1$), the core speed ($N_2$), fan inlet temperature, fan inlet pressure, the LPC outlet temperature, the combustor static pressure, the HPT exhaust gas temperature and the core exhaust pressure. Other actuators can be measured including the fuel flow (WF), variable bleed valve (VBV) and variable stator veins (VSV) operation.

Typically the EGT is a primary measure of engine health. The EGT can be compared with the primary engine power indication called the engine pressure ratio (EPR). For example, at full power EPR there is a maximum permitted EGT limit. Once an engine reaches a stage where it reaches this EGT limit, the engine requires maintenance. The amount below the EGT limit is the EGT margin and this margin would be greatest when the engine is new or has been overhauled. The EGT margin is a buffer between an engine's normal operating EGT temperature and its maximum EGT and the higher EGT is an indication of the HPC wear that can cause a compressor stall. Engines are rarely used at the full thrust rating and usually have a level of derate for take-off power that reduces the EGT and increases the EGT margin. Derates at 5% and 10% will reduce EGT and increase the EGT margin by as much as 36 degrees. Derating can be used if the aircraft take-off weight is less than permitted maximum take-off weight (MTOW) and a long runway is available or the OATS are relatively low.

Air frame health management allows in-flight diagnosis and assessment through the integration of the wireless engine sensors, sensoring materials and advanced algorithms that reconstruct damage fields and estimate structural durability and remaining useful life. These algorithms could be incorporated within the WEMS module and incorporate advanced information processing techniques including neural networks, expert systems, fuzzy logic systems, pattern recognition, signal processing for spectral analysis and feature extraction and statistical algorithms for detection, estimation, prediction and fusion. It is also possible to use the EWSN 600 and WEMS module 94 to maintain LRU (line replaceable unit) fault states that have a gas path impact such as offset errors in gas path sensors or actuators. This could reduce false alarms and false ambiguities. The WEMS module 94 as described also enables greater control over life limited parts (LLP) such as the rotating turbine engine parts that are critical to engine integrity and are difficult to inspect outside the engine. The WEMS module 94 in conjunction with the wireless sensor network 600 provides engine condition base maintenance (CBM) to optimize engine maintenance costs while increasing operational performance with advanced fleet management and removal planning of aircraft engines.

The wireless engine sensors may sense engine parameters as engine data based on an engine sampling algorithm that is received from the WEMS module 94. The new algorithm may be uploaded via a ground based transceiver and processor as part of an engine data control center or ESP 562 that processes engine data generate and transmit back to the aircraft a new engine sensing algorithm, which may be transmitted via the UHF satellite link to the CWLU 532 preferably to the PC card 30 and the WEMS module 94, and then to the wireless sensor network (EWSN) 600. The WEMS module 94 may store dynamic or static algorithms.

Dynamic algorithms that are uploaded to the WEMS module may instruct the sensor network 600 to sample new engine data via instructions to individual sensors to start, stop, or change a sampling rate. The dynamic algorithms could also be directed to engine analytics besides changing of sampling rates on sensors. For example, selected sensor data could be analyzed as parsed data or large portions of data analyzed in the WEMS processor and in conjunction with the processor of the PC card to extract certain portions of data. Thus, the processing capabilities of both the WEMS module 94 and the PC card processor are used in conjunction with each other. This could include parsing of data and specific processing of data in conjunction with data from the ACU. This allows better control over algorithm data collection and processing, including data received from the flight deck and data received from the ESP or other control center on the ground. The ground based control center or ESP 562 generates engine performance reports indicative of the engine health and status. These can be mini-reports by phase of flight corresponding to taxiing, take-off, climb, cruise, descent, final approach, and taxiing.

The comparative fuel performance of turbine engines may be analyzed using a differential fuel flow by phase of flight. This could include a comparative fuel performance of dual turbine engines or a plurality of turbine engines mounted on the aircraft and using common environmental factors. For example, each phase of flight corresponds to a certain time period or range of time such as taxiing, take-off and the other phases as noted before. The weight of the fuel at each phase of flight or combination of phases or the entire flight for each turbine engine can be calculated as the absolute value at each phase by the formula: Wf $\Delta=|Wf_1-Wf_2|$ with $Wf_1$ corresponding to the weight of fuel consumed at one of the phases, or at a combination of phases, or all the phases added together for engine 1. $Wf_2$ corresponds to the weight of fuel consumed at one or more phases in engine 2.

Because the algorithms are uploaded to the WEMS module 94 and data is transmitted from the wireless engine sensors 600 to the WEMS module 94 and via the PC card 30 in this example into the wireless LAN unit 532 within the aircraft via the CWLU 532, the pilot may have access to the data for processing on board the aircraft. The pilot may initiate engine operating changes, such as shutting down an engine during an emergency or making pilot initiated changes to sensor sampling at a selected engine if the pilot wants additional data on a specific engine component. The pilot could initiate other engine operation changes. It is preferred that data is off-loaded to the ground based control center or ESP 562 for processing. The WEMS module 94 may be configured on-the-fly with uploaded new engine sampling algorithms or other algorithms that are used to operate the engine and other aircraft systems. An important consideration in engine operation is the Exhaust Gas Temperature (EGT), which can be indicative of the operating efficiency of the turbine engine. For example, if the engine is in need of maintenance or has structural integrity problems or other issues, often the exhaust gas temperature will increase over a period of time and be higher than normal. The pilot could initiate additional engine sensor sampling to gain a better understanding of engine operation and performance during different phases of flight and maintain better control over how the exhaust gas temperature changes during the phases of flight or other flight circumstances. The system is advantageous to monitor the health and status of turbine engines from "on the engine" rather than from the flight deck in certain circumstances.

It should be understood that the exhaust gas temperature is an excellent measure of engine health and an overall indicator of mechanical stress where the EGT rises over time as the engine uses up its useful on-wing life. Determinations can be made at the ground based control center 300 regarding any temperature differences between the actual operating temperature and an absolute maximum operating temperature known as redline that becomes a function of the EGT margin. The ESP 562 or other control center on the ground can determine with the pilot when full thrust is applied and determine if the EGT maximum is surpassed. Also, the ground based control center or ESP 562 may determine how the pilots are operating the engine, which can have an impact on the exhaust gas temperature and cause engines to fail early. Pilots can later be educated for better flight practices. It is also possible to use the portable wireless communications device features such as with a flight marshall as disclosed in commonly assigned U.S. Pat. No. 7,328,012, the disclosure which is hereby incorporated by reference in its entirety.

Experiments were conducted showing the feasibility of using the aircraft skin by using an IEEE 802.11b wireless Local Area Network (LAN) card operating in a PC card slot of a laptop computer. The aircraft used was a Canadair CL-604 regional jet aircraft. The laptop for this test was placed in a rear equipment bay, which is outside of the pressure hull. It is vented to the atmosphere through a set of louvers on the belly of the aircraft. The laptop was set to run on its own battery power for the duration of the test. The importance of this fact is to note that there was no coupling of the electrical systems (DC or RF) of the aircraft and the laptop computer. The laptop was set to perform a "ping" operation continuously to provide a steady stream of packets for the Radio Frequency (RF) measurements.

Figure 13:
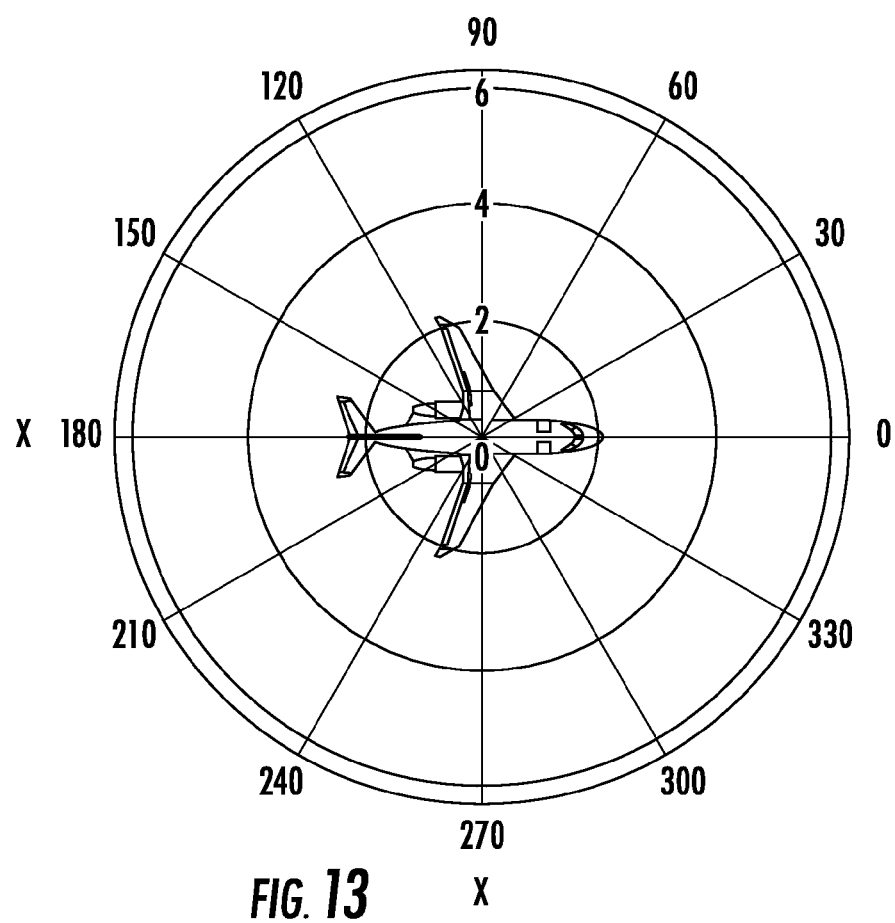
FIG. 13 is a graph showing a polar plot superimposed on a regional jet for a 20 meter radiated field test using the system of the present invention.
Figure 14:
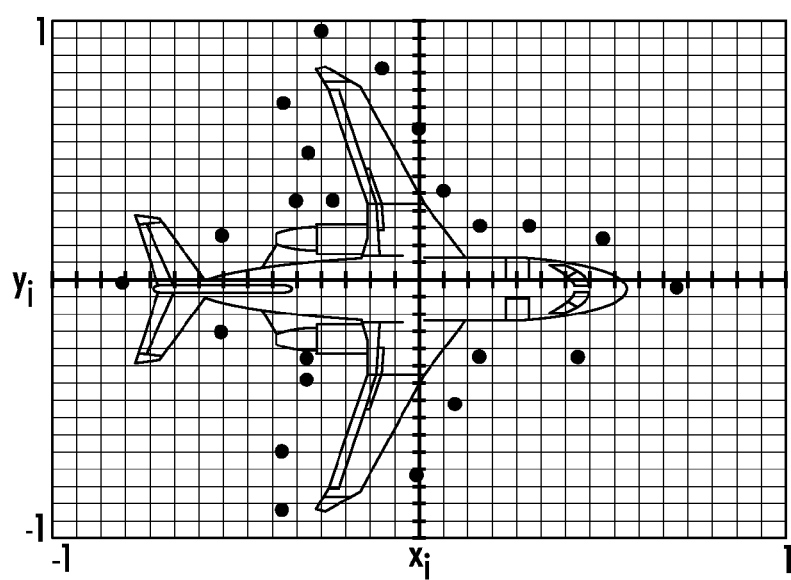
FIG. 14 is a graph showing a rectangular grid superimposed on the regional jet used for the close-in far field measurements using the system of the present invention.

The tests consisted of two parts. The first test was a series of measurements taken at a distance of 20 meters from the center of the aircraft (FIG. 13). The measurements were spaced 15 degrees apart with zero degrees centered on the nose of the aircraft. The second set of measurements was taken at a uniform distance of 2 meters from the closest approach to the skin of the aircraft and spaced 3 meters apart (FIG. 14).

The measurement equipment included an Agilent model 8563 EC spectrum analyzer connected through a 6 meter cable to a 2.4 GHz test antenna. The antenna was mounted on a nonconductive pole approximately 2 meters long. This height placed it at the outer bulge of the aircraft skin and above the level of local sources of multi-path and other unintentional re-radiators.

The first 20 meter test was intended to ascertain the far field pattern of radiation within the available ramp space of the airport while at a reasonably large distance from the aircraft. The second 2 meter test was intended to examine the close-in far field for point-like or line-like radiators which would contribute disproportionately to the far field pattern or conversely eliminate them as major contributors.

FIG. 13 is a polar plot superimposed on a CL-604 regional jet for the 20 meter radiated field test, and illustrates the geometry for the 20 meter data collection effort. The aircraft is approximately 21 meters long overall and 19½ meters wingtip-to-wingtip. Thus, the first measurement was, in general, 20 meters or more from the closest point of approach to the aircraft skin.

FIG. 14 illustrates the superposition of a rectangular grid over the outline of the CL-604 aircraft for close-in fair field measurements and the transposed data points collected to determine if any strong, point-source radiators existed to account for the far field radiation pattern. These measurements used the same data collection equipment as that used in the first test. Each circle represents one point of measurement.

Figure 15:
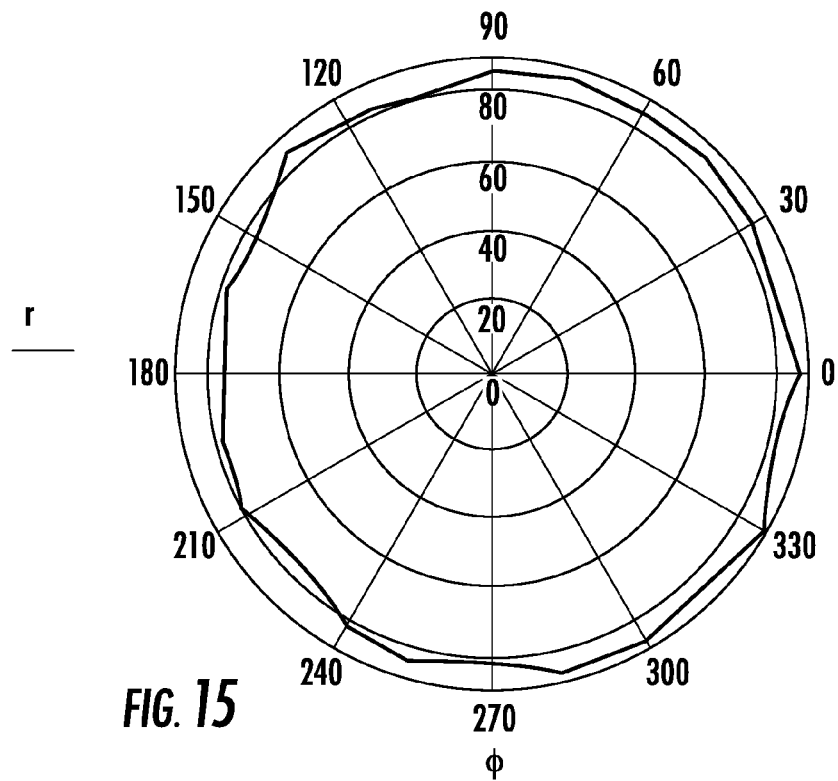
FIG. 15 is a graph showing a plot of the 20 meter radio frequency field readings using the system of the present invention.
Figure 16:
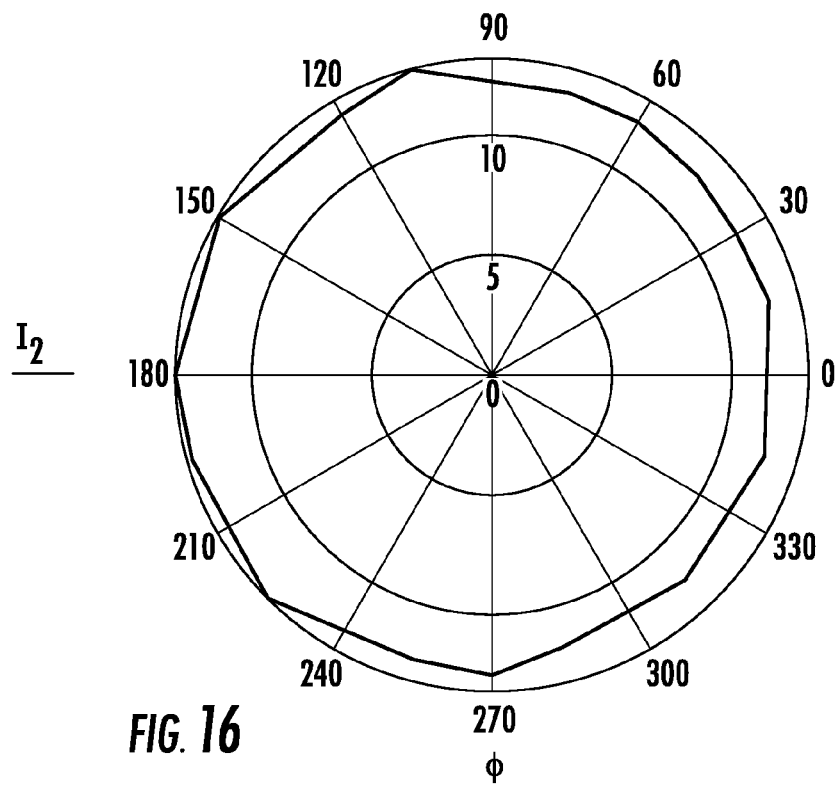
FIG. 16 is a graph showing the rationalized plot of FIG. 8 data.

The data from the first test (20 meter) was tabulated and plotted in a polar format below as later shown in the graph of FIG. 15. The angular dimension represents the stepwise progression of data points beginning with the nose of the aircraft at 0 degrees. The radial dimension represents the received RF power in dBm at 20 meter distance at the indicated angle. Due to this representation of data it may appear somewhat counterintuitive that the most distant points have reduced power readings. FIG. 16 corrects this perceptual preference and shows a rationalized polar plot of FIG. 15. That plot does not attempt to scale exactly the power readings, but show the relative amplitudes for comprehensibility. The tabulated data as reflected in FIGS. 15 and 16 are shown in the table below:

$$Ch\ 1 := \begin{pmatrix} 0\text{-deg} & 86.4 \\ 15\text{-deg} & 83.37 \\ 30\text{-deg} & 84.53 \\ 45\text{-deg} & 84.03 \\ 60\text{-deg} & 82.53 \\ 75\text{-deg} & 83.03 \\ 90\text{-deg} & 82.53 \\ 105\text{-deg} & 77.03 \\ 120\text{-deg} & 80.2 \\ 135\text{-deg} & 81.53 \\ 150\text{-deg} & 75.70 \\ 165\text{-deg} & 77.03 \\ 180\text{-deg} & 75.53 \\ 195\text{-deg} & 77.2 \\ 210\text{-deg} & 78.87 \\ 225\text{-deg} & 75.53 \\ 240\text{-deg} & 81.20 \\ 255\text{-deg} & 82.37 \\ 270\text{-deg} & 80.53 \\ 285\text{-deg} & 86.03 \\ 300\text{-deg} & 87.37 \\ 315\text{-deg} & 85.37 \\ 330\text{-deg} & 87.87 \\ 345\text{-deg} & 83.53 \\ 360\text{-deg} & 86.4 \end{pmatrix} *$$

$$\phi := CH1^{(0)}$$

$$r := CH1^{(1)}$$

$$I_1 := (-CH1)^{(1)}$$

$$I_2 := \frac{1}{CH1^{(1)}}$$

$$I_2 := I_2 \cdot 1000$$

-continued $$I_1 = \begin{array}{|c|c|} \hline & 0 \\ \hline 0 & -86.4 \\ \hline 1 & -83.37 \\ \hline 2 & -84.53 \\ \hline 3 & -84.03 \\ \hline 4 & -82.53 \\ \hline 5 & -83.03 \\ \hline 6 & -82.53 \\ \hline 7 & -77.03 \\ \hline 8 & -80.2 \\ \hline 9 & -81.53 \\ \hline 10 & -75.7 \\ \hline 11 & -77.03 \\ \hline 12 & -75.53 \\ \hline 13 & -77.2 \\ \hline 14 & -78.87 \\ \hline 15 & -75.53 \\ \hline \end{array}$$

$$I_2 = \begin{array}{|c|c|} \hline & 0 \\ \hline 0 & 11.574 \\ \hline 1 & 11.995 \\ \hline 2 & 11.83 \\ \hline 3 & 11.901 \\ \hline 4 & 12.117 \\ \hline 5 & 12.044 \\ \hline 6 & 12.117 \\ \hline 7 & 12.982 \\ \hline 8 & 12.469 \\ \hline 9 & 12.265 \\ \hline 10 & 13.21 \\ \hline 11 & 12.982 \\ \hline 12 & 13.24 \\ \hline 13 & 12.953 \\ \hline 14 & 12.679 \\ \hline 15 & 13.24 \\ \hline \end{array}$$

The smooth nature of the curve depicted in FIGS. 15 and 16, with no extreme peaks or valleys, suggests either a large number of evenly distributed emitters on the fuselage of the aircraft, or alternatively, that the body or skin of the aircraft is the predominant source of the radiation. The conclusion that the body (skin) of the aircraft is the predominant source of radiation is reinforced by the small, uniform increase in amplitude in the rear hemisphere.

The RF field data from the second set of measurements for the close-in portion of the far field was plotted on a rectilinear graph based on a scaled image of the aircraft obtained from the manufacturer's maintenance manual. This transposition is shown above in FIG. 14. These data points were then incorporated in a 22 by 2 matrix, which provided a two dimensional representation of the area around the aircraft. The raw data for the non-zero matrix entries is shown below. The matrix subscripts are the x and y positions of the data point and the value of the matrix entry is the RF power expressed in dBm.

$Ch_{27,13} := -86.33$
$Ch_{23,16} := -81.17$
$Ch_{20,16} := -80.50$
$Ch_{17,17} := -87.67$ $Ch_{14,22}:=-83.00$
$Ch_{12,26}:=-80.67$
$Ch_{9,28}:=-83.00$
$Ch_{8,23}:=-76.00$
$Ch_{9,21}:=-75.67$
$Ch_{10,18}:=-75.67$
$Ch_{8,18}:=-71.83$
$Ch_{5,16}:=-64.50$
$Ch_{0,13}:=-74.83$
$Ch_{5,10}:=-68.17$
$Ch_{9,9}:=-64.33$
$Ch_{9,7}:=-71.17$
$Ch_{8,3}:=-81.33$
$Ch_{8,0}:=-83.67$
$Ch_{14,2}:=-78.5$
$Ch_{16,6}:=-81.67$
$Ch_{17,9}:=-83.00$
$Ch_{22,9}:=-79.50$

Figure 17:
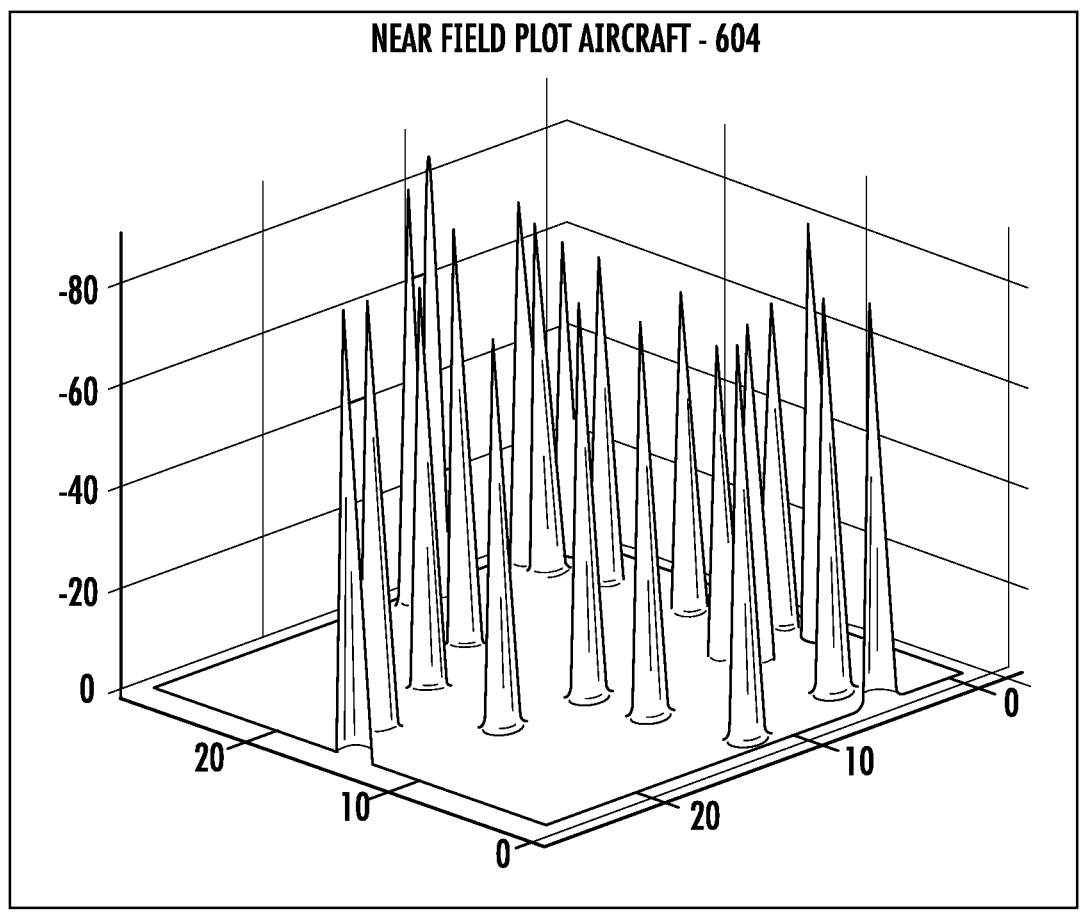
FIG. 17 is a three dimensional perspective view of the near-skin data collected by using the system of the present invention.
Figure 18:
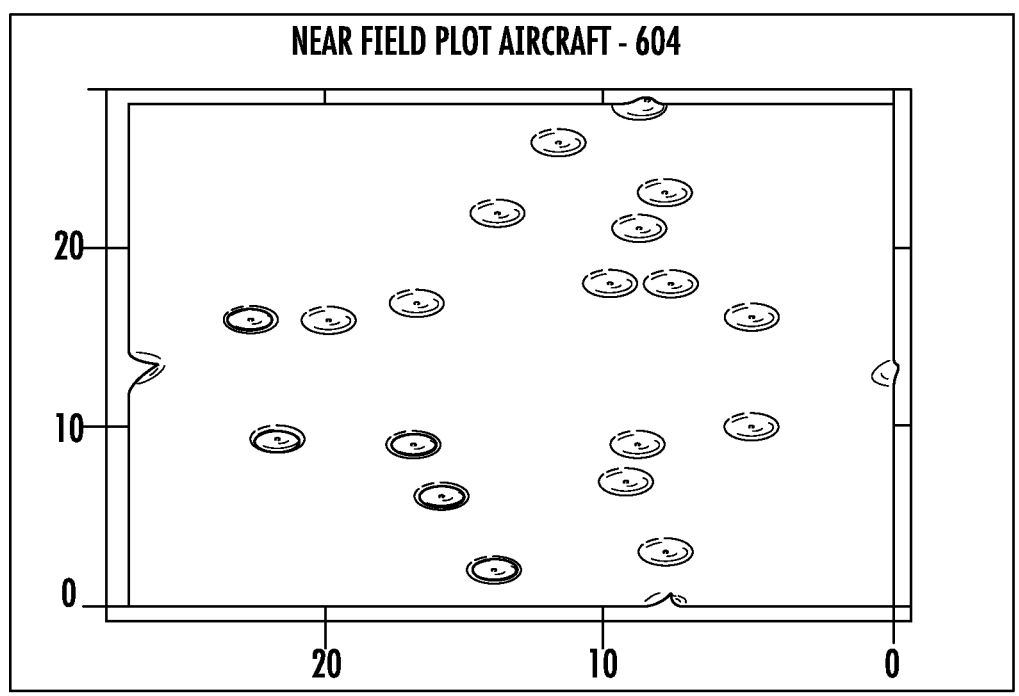
FIG. 18 is a plan view of the data shown in FIG. 10.

The data in this matrix has been plotted in a three dimensional representation, which is presented in two views. The first view shown in FIG. 17 as a three dimensional perspective view of the near-skin data to assist visualization of the field strength measurements in relation to the aircraft. The second view shown in FIG. 18 is a plan view of FIG. 17, which aids in helping to determine a reasonable accuracy of the data positioning and the aircraft orientation.

Figure 19:
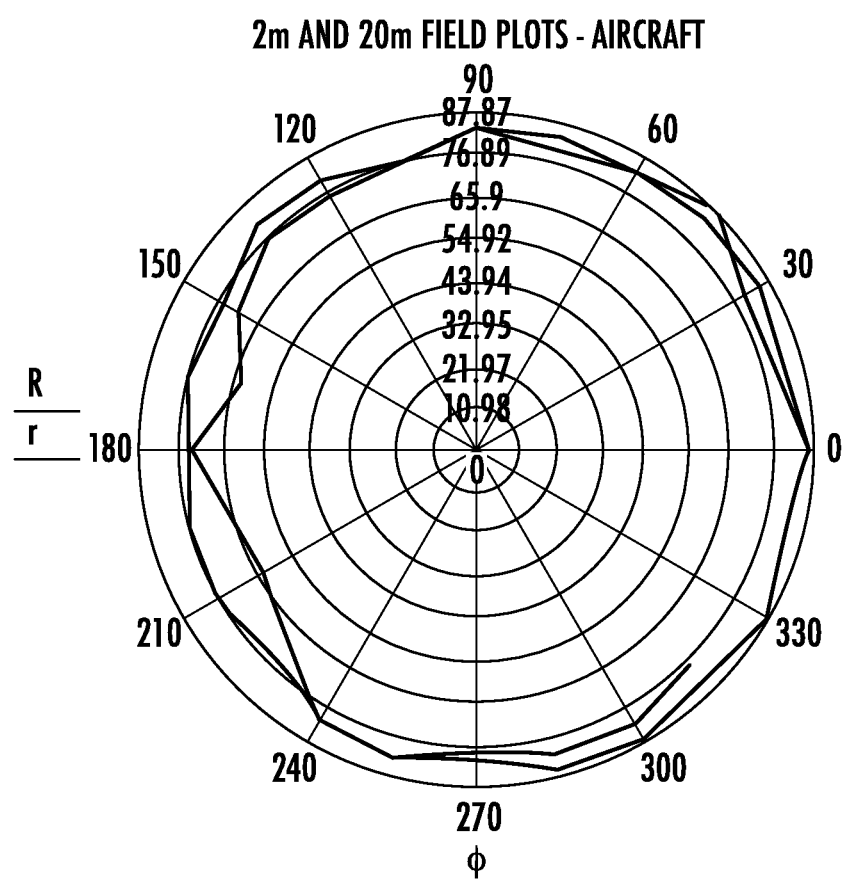
FIG. 19 is a graph showing a two-curved plot of the 20 meter and 2 meter data for comparison purposes.

Based upon these results, it was possible to create a direct comparison between the two field plots either mathematically, graphically or both. This was accomplished by converting the rectilinear coordinates of the near-skin plot to polar coordinates and plotting the data in two curves on one polar plot. Data for the results is shown below and a two curve plot of the 20 meter and 2 meter data for comparison purposes is shown in FIG. 19 for comparison purposes.

$$V := \begin{pmatrix} 13.5 & 0.0 \\ 10 & 2.8 \\ 6.5 & 3.5 \\ 4.25 & 3.5 \\ 1.25 & 9.0 \\ -0.5 & 12.5 \\ -3.5 & 14.5 \\ -5.2 & 10.3 \\ -4.0 & 7.5 \\ -2.8 & 4.8 \\ -4.8 & 4.8 \\ -8.25 & 2.8 \\ -12.8 & 0.0 \\ -8.25 & -3.0 \\ -4.0 & -4.25 \\ -4.0 & -5.75 \\ -5.25 & -10.0 \\ -5.25 & -13.25 \\ 1.25 & -11.25 \\ 3.00 & -7.0 \\ 4.25 & -4.25 \\ 9.0 & -4.25 \end{pmatrix}$$

$$P := \begin{pmatrix} 86.33 \\ 81.17 \\ 80.50 \\ 87.67 \\ 83.00 \\ 80.67 \\ 83.00 \\ 76.00 \\ 75.67 \\ 75.67 \\ 71.83 \\ 64.5 \\ 74.83 \\ 68.17 \\ 64.33 \\ 71.17 \\ 81.33 \\ 83.67 \\ 78.5 \\ 81.67 \\ 83.00 \\ 79.5 \end{pmatrix}$$

$i:=0, 1 \ldots 21$
$j:=0 \ldots 1$
$R_i:=P_i$

In FIG. 19 and in the data represented above, the quantities i and j are indices for the polar data plot and the change of variable from P to R is for convenience. The function φ1 and "angle( )" create a set of angular coordinates from a pair of rectilinear coordinates by returning the angle from the positive x axis of the coordinate pair. This function operates from 0 to 2π. The radial coordinates are in dBm from zero at the origin to 87.87 dBm at the periphery. As before, the dBm are actually −dB from the value at the transmitter.

$$\Phi 1_i := \text{angle}\left[(V^{\langle 0 \rangle})_i, (V^{\langle 1 \rangle})_i\right]$$

The two curves indicate the possible mechanisms for the RF radiation pattern from the aircraft. Certain points of interest are: (a) neither curve exhibits significant variability as would be the case if the sources were a small number of discreet emission sources; (b) the two curves almost overlay one another forward of the wing area, the region farthest from the internal RF source. They are not grossly divergent aft of the wing area; and (c) the power level of the radiation is not decreasing at the rate of a point source, i.e., $1/r^2$, it is more like the emission from a line source, $1/r$.

Two credible mechanisms to explain the RF radiation patterns are: (1) a large number of discreet emitters distributed fairly uniformly around the aircraft; or (2) the excitation of the aircraft skin with concomitant radiation of a uniform nature, tailing off only as a result conduction losses in the skin as the surface wave moves from the source area aft to the forward area. A third possibility is, of course, a combination of these two mechanisms.

The possibility of discrete sources distributed over the aircraft skin was explored and discarded. Two areas of possible strong radiation from openings were also examined to determine if any fuselage opening account for the strength of RF emissions. The cockpit windows and the louvered hatch into the aft equipment bay containing the laptop was examined. Placing the antenna directly in front of the cockpit window produced no change in the measured field as compared to 2 or 20 meters directly forward of the nose. A double layer of metalized mylar sheeting was placed over the louvers in the aft hatch and prior readings were repeated. An approximately 1 dB drop in received power level was observed.

The relatively smooth and similar measurements at the two distances indicate a reasonably uniform source for the radiated energy, both by way of the lack discontinuities and from the lack of a $1/r^2$ behavior of the power readings.

Figure 20:
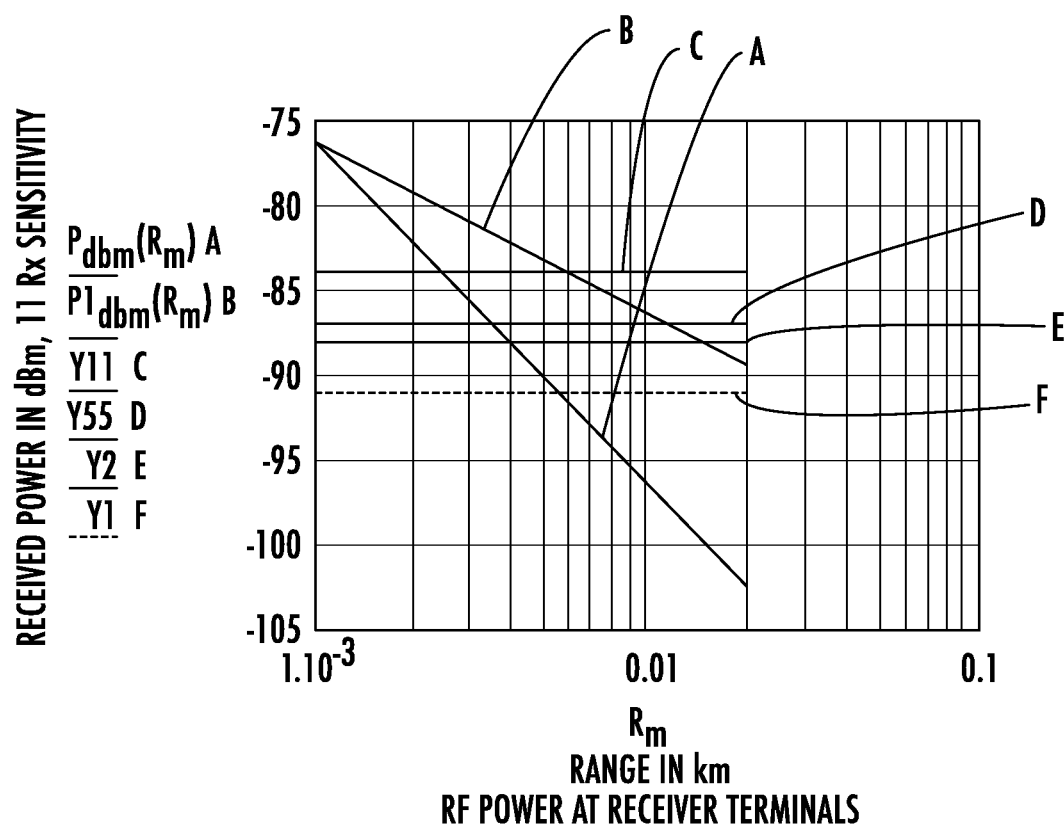
FIG. 20 is a graph showing the representation of $1/r$ and $1/r^2$ power roll off as a function of distance.

The field from an infinite conducting plate does not fall off as a function of distance. If two opposing edges of the plate are brought together to form an infinitely long conducting line, the power falls of as $1/r$, and further, that if the ends of the line are shrunk down to point, then the power falls off as $1/r^2$. This is illustrated in FIG. 20, which has been constructed to reflect the measurements obtained from the aircraft. FIG. 20 is a graph representative of $1/r$ and $1/r^2$ power roll off as a function of distance. One line is $1/r^2$ and another line is $1/r$. The horizontal lines represent the nominal sensitivity of the wireless NIC at the indicated data rates. It should be noted that the $1/r$ curve appears to fit the measured data more closely than the other curve.

The minor extrapolation of the curve to aircraft skin surface shows a source strength of −35 dBm. The actual source inside the aircraft is generating approximately +15 dBm, and thus, it appears that there is a 50 dB loss in coupling to the skin, which is a reasonable number. Based on the available data and this informal ad hoc measurement methodology, it is not unreasonable to assume that the aircraft is a combination finite line and, to a lesser degree, a finite curved surface emitter which would allow prediction of the behavior of other aircraft models and types.

These measurements make it clear that a broadband, digital communication system can be installed in the avionics bay of any aircraft and, without having to mount external antenna, communicate reliably with the terminal offices at operationally useful distances. Some experiments were also conducted on several different models of commercial aircraft to begin answering some of these tests involved placing a laptop within the avionics bay of different aircraft, closing up the aircraft and, using a second laptop, determine the distance away from the fuselage that the external computer could continue to communicate with the internal one. In general, it was found that this could be accomplished at a distance of 60 to 90 m with reasonable data rates. However, the coupling mechanism of the energy from one computer to the other through the aircraft's skin was not understood sufficiently to proceed with assertions that this was operationally feasible for a wide range of aircraft types and models. This concern generated the above data collection and analysis.

Based on the data collected and heuristic analysis, the energy is coupled from free space propagation into the skin of the aircraft which then re-radiates the energy after an attendant propagation and/or conduction loss. This loss, measured at any given point in the radiation pattern close to the aircraft skin, is typically on the order of 40 to 50 dB from the source power level.

In predicting the available RF power at any given operationally useful range, the aircraft can be viewed as a collection of line radiators. This is a conservative, but reasonable conclusion. A subsidiary conclusion is that the field will be fairly uniform in the forward hemisphere of the aircraft. This tentative conclusion is based on an aft placement of the RF source.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for transmitting aircraft data from an aircraft, comprising:
    a wireless engine monitoring module mounted on the aircraft engine that collects engine data relating to operation of the aircraft engine and includes a wireless engine monitoring transceiver that transmits and receives the collected engine data over a first wireless communications signal;
    a Data Acquisition Unit (DAU) that records aircraft data;
    a PC card interfaced to the DAU, comprising
        a memory that stores the aircraft data from the DAU;
        a processor coupled to the memory and configured to retrieve aircraft data from the memory;
        a first wireless transceiver controlled by the processor that receives and transmits the aircraft data over a second wireless communications signal;
    a wireless local area network (LAN) communications unit configured as an access point and positioned within the aircraft that transmits and receives the first and second wireless communications signals to and from the respective wireless engine monitoring module and the PC card; and
    a second wireless transceiver mounted within the aircraft that receives a third wireless communications signal containing aircraft data and the engine data from the wireless LAN communications unit and transmits the aircraft data and engine data from the aircraft.

2. The system according to claim 1, wherein said second wireless transceiver comprises a UHF transceiver configured to transmit and receive aircraft data and engine data over an air-to-ground communications signal.

3. The system according to claim 1, wherein said second wireless transceiver comprises a satellite communications transceiver configured to transmit and receive aircraft data and engine data over a satellite communications link.

4. The system according to claim 1, wherein said aircraft data comprises data related to at least one of aircraft contents, passenger data aircraft departure and arrival, passenger transactions or data from a sky marshall.

5. The system according to claim 1, wherein said aircraft data comprises flight performance data.

6. The system according to claim 1, wherein said engine data comprises at least one of full flight aircraft engine data and parsed aircraft engine data.

7. The system according to claim 1, further comprising a logic circuit connected to the processor and DAU and configured to allow the DAU to extract aircraft data from the DAU into the memory of the PC card.

8. The system according to claim 1, wherein said first, second and third wireless communications signals comprise spread spectrum communications signals.

9. An aircraft data communications system comprising:
    an engine monitoring module configured to be mounted at an aircraft engine of the aircraft and comprising, a wireless engine monitoring transceiver, a first memory, a first processor coupled to the first memory and wireless engine monitoring transceiver and configured to:

collect and store in the first memory engine data relating to at least one engine parameter sensed during operation of the aircraft engine, and transmit the engine data from the wireless engine monitoring transceiver over a first wireless communications signal;

a Data Acquisition Unit (DAU) that records aircraft data;

a PC card interfaced to the DAU, comprising a second memory that stores aircraft data from the DAU and engine data received from the engine monitoring module, a second processor coupled to the second memory and configured to retrieve aircraft data and engine data, and a first wireless transceiver controlled by the second processor that receives engine data transmitted from the engine monitoring module for storage within the second memory and wirelessly transmits the aircraft data and engine data along a second wireless communications signal, a wireless local area network (LAN) communications unit configured as an access point and positioned within the aircraft that transmits and receives first and second wireless communications signals to and from the engine monitoring module and the PC card; and a second wireless transceiver mounted within the aircraft that receives a third wireless communications signal containing aircraft data and engine data from the wireless LAN communications unit and transmits the aircraft data and engine data from the aircraft.

10. The system according to claim 9, wherein said first processor at said engine monitoring module is configured to retrieve engine data and parse said engine data into selected segments of engine data.

11. The system according to claim 9, comprising a plurality of wireless engine sensors associated with the aircraft engine, each configured to sense an engine parameter as engine data and transmit the engine data to the wireless engine monitoring transceiver for transmission to the PC card.

12. The system according to claim 9, wherein each wireless engine sensor is configured to receive from the wireless engine monitoring module an engine sensing algorithm having data for changing a sampling rate of selected wireless engine sensors.

13. The system according to claim 9, wherein said second wireless transceiver comprises a UHF transceiver configured to transmit and receive aircraft data and engine data over an air-to-ground communications signal.

14. The system according to claim 9, wherein said second wireless transceiver comprises a satellite communications transceiver configured to transmit and receive aircraft data and engine data over a satellite communications link.

15. The system according to claim 9, wherein said aircraft data comprises data related to at least one of aircraft contents, passenger data, aircraft departure and arrival, passenger transactions or data from a sky marshall.

16. The system according to claim 9, wherein said aircraft data comprises flight performance data.

17. The system according to claim 9, wherein said engine data comprises at least one of full flight aircraft engine data and parsed aircraft engine data.

18. The system according to claim 9, further comprising a logic circuit connected to the second processor at the PC card and to the DAU and configured to allow the DAU to extract aircraft data from the DAU into the second memory of the PC card.

19. The system according to claim 9, wherein said wireless communications signal comprises a spread spectrum communications signal.

20. A method for transmitting aircraft data from an aircraft, comprising:

acquiring engine data within a wireless engine monitoring module that is mounted on the aircraft engine;

wirelessly transmitting the engine data from a wireless engine monitoring transceiver within the wireless engine monitoring module along a first wireless communications signal;

acquiring aircraft data within a memory of a PC card that is interfaced to a Data Acquisition Unit (DAU) of the aircraft;

retrieving aircraft data from the memory;

wirelessly transmitting from a first wireless transceiver the retrieved aircraft data along a second wireless communications signal;

receiving the wireless communications signal within a wireless local area network (LAN) communications unit mounted within the aircraft and configured as a wireless access point;

transmitting the aircraft data and engine data along a third wireless communications signal from the wireless LAN communications unit to a second wireless transceiver mounted within the aircraft; and transmitting the aircraft data and engine data from the second wireless transceiver out of the aircraft.

21. The method according to claim 20, wherein said second wireless transceiver comprises a UHF transceiver configured to transmit and receive aircraft data and engine data over an air-to-ground communications signal.

22. The method according to claim 20, wherein said second wireless transceiver comprises a satellite communications transceiver configured to transmit and receive aircraft data and engine data over a satellite communications link.

23. The method according to claim 20, wherein said aircraft data comprises data related to at least one of aircraft contents, passenger data, aircraft departure and arrival, passenger transactions or data from a sky marshall.

24. The method according to claim 20, wherein said aircraft data comprises flight performance data.

25. The method according to claim 20, wherein said engine data comprises one of at least full flight aircraft engine data and parsed aircraft engine data.

26. The method according to claim 20, further comprising extracting aircraft data from the DAU into the memory of the PC Card via a logic circuit connected to the DAU.

27. The method according to claim 20, wherein said first, second and third wireless communications signals comprise spread spectrum communications signals.

* * * * *